United States Patent [19]
Suzuki et al.

[11] Patent Number: 5,390,252
[45] Date of Patent: Feb. 14, 1995

[54] AUTHENTICATION METHOD AND COMMUNICATION TERMINAL AND COMMUNICATION PROCESSING UNIT USING THE METHOD

[75] Inventors: Shigefusa Suzuki, Iruma; Tatsuo Nohara, Hachiouji, both of Japan

[73] Assignee: Nippon Telegraph and Telephone Corporation, Tokyo, Japan

[21] Appl. No.: 171,663

[22] Filed: Dec. 22, 1993

[30] Foreign Application Priority Data

Dec. 28, 1992 [JP] Japan .................................. 4-348296
Dec. 28, 1992 [JP] Japan .................................. 4-348297

[51] Int. Cl.$^6$ .............................................. H04L 9/32
[52] U.S. Cl. ........................................ 380/23; 379/62; 902/2
[58] Field of Search ................................ 380/23–25, 380/49, 4; 379/201, 62; 902/2

[56] References Cited

U.S. PATENT DOCUMENTS

| | | | |
|---|---|---|---|
| 4,665,396 | 5/1987 | Dieleman | 380/23 |
| 5,077,790 | 12/1991 | D'Amico et al. | 380/23 |
| 5,204,902 | 4/1993 | Reeds, III et al. | 380/23 |
| 5,225,664 | 7/1993 | Iijima | 380/23 X |
| 5,249,230 | 9/1993 | Mihm, Jr. | 380/23 |
| 5,282,250 | 1/1994 | Dent et al. | 380/23 |
| 5,345,506 | 9/1994 | Tsubakiyama et al. | 380/23 |

*Primary Examiner*—Gilberto Barrón, Jr.
*Attorney, Agent, or Firm*—Pollock, Vande Sande & Priddy

[57] ABSTRACT

In a first processing mode for a first communication request, a communication processing unit responds to a communication request signal from a communication terminal to acquire an authentication key Ka corresponding thereto from a storage, generates pieces of enciphered authentication information Xai and Xbi enciphered by the authentication key Ka of the communication terminal and an authentication key Kb of the communication processing unit, respectively, and random information Yi and transmits these pieces of information Xai, Xbi and Yi as an authentication request signal to the communication terminal. The communication terminal sends, as an authentication response signal, information Ka[Yi] obtained by enciphering the received random information Yi with the authentication key Ka, back to the communication processing unit, and at the same time, the communication terminal stores the received enciphered pieces of authentication information Xai and Xbi. The communication processing unit verifies the authentication response signal by use of the authentication key Ka.

In a second processing mode, the communication terminal transmits previous enciphered authentication information Xb(i−1) as a communication request signal to the communication processing unit and deciphers previous information Xa(i−1) to generate an authentication key Kci. The communication processing unit deciphers the received enciphered authentication information Xbi to generate a deciphered authentication key Kci and transmits to the communication terminal an authentication request signal containing newly generated pieces of enciphered authentication information Xai and Xbi and the random information Yi. The communication terminal stores the received pieces of enciphered authentication information Xai and Xbi and enciphers the random information Yi by the authentication key Kci and sends it as an authentication response signal Kci[Yi] to the communication processing unit, which verifies the authentication response signal by the deciphered authentication key Kci.

22 Claims, 15 Drawing Sheets

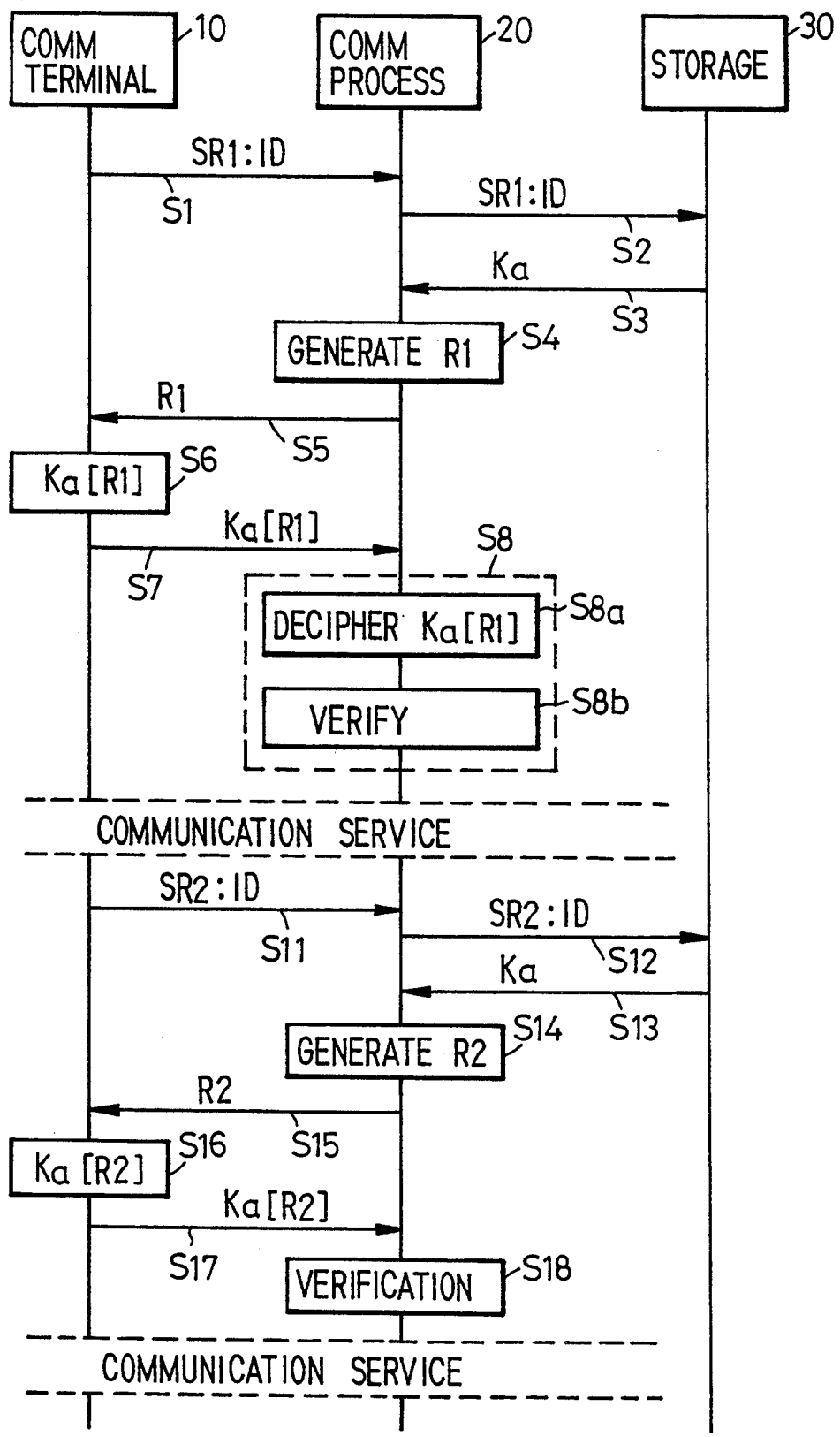

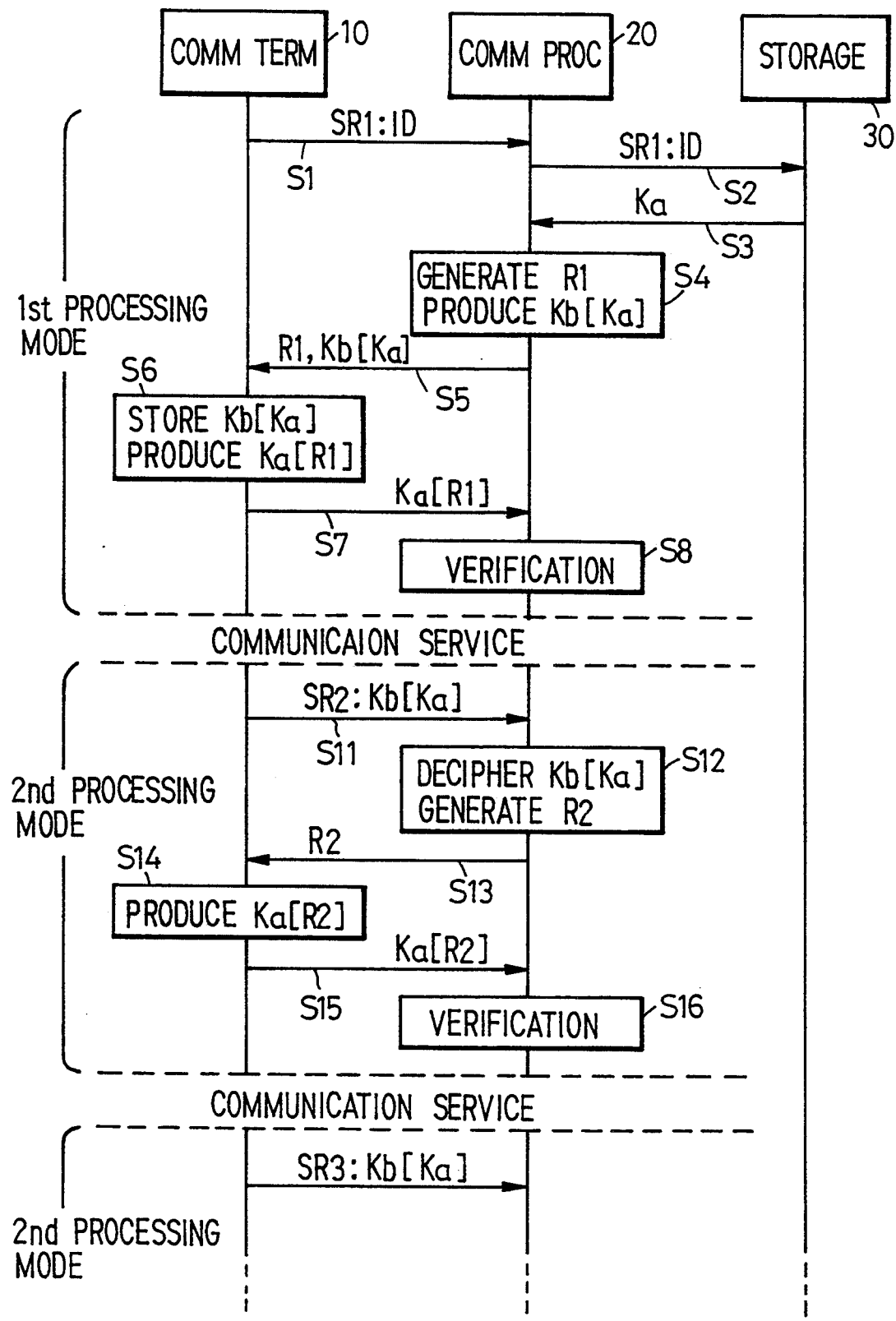

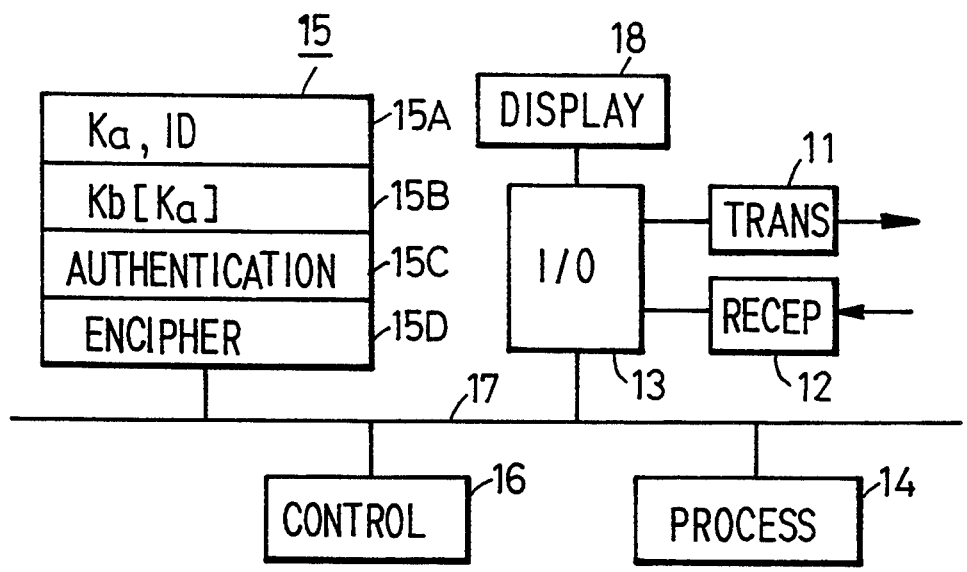
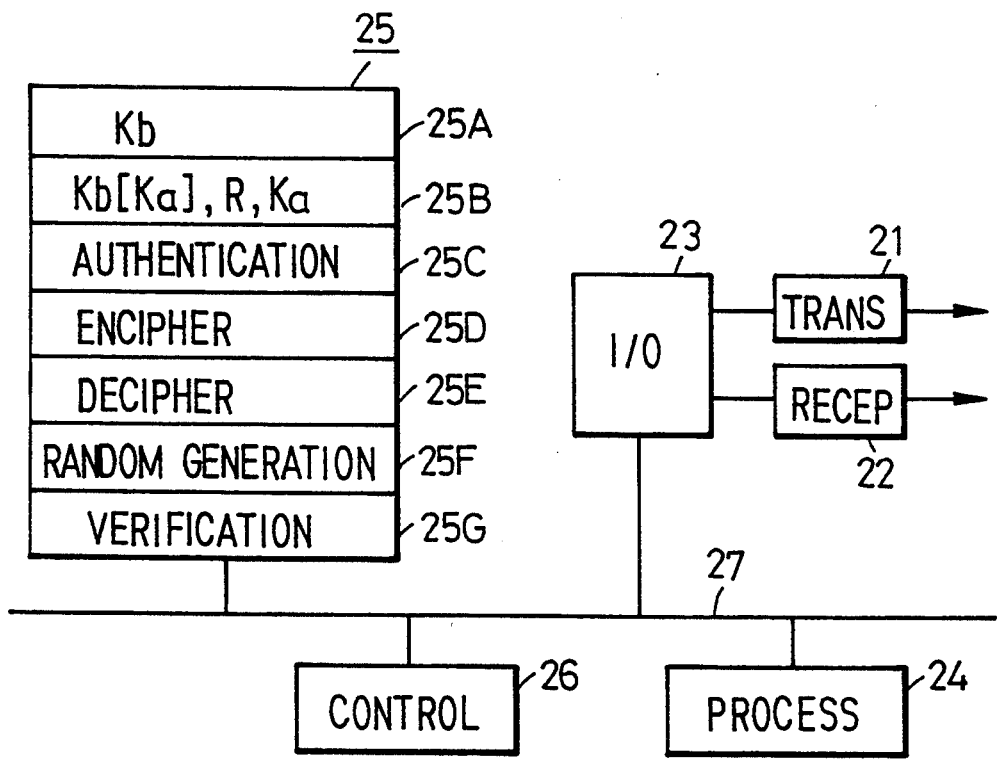

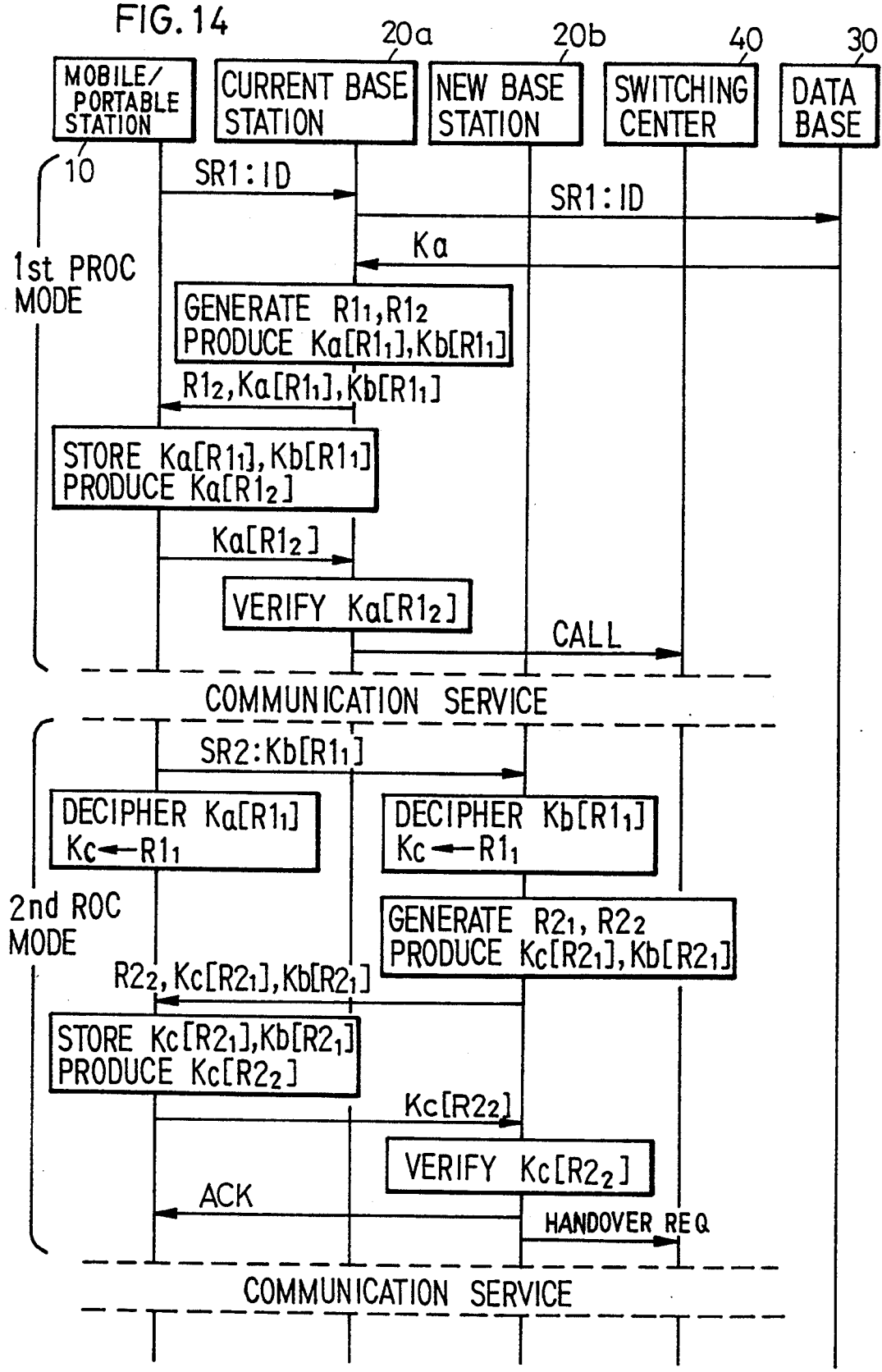

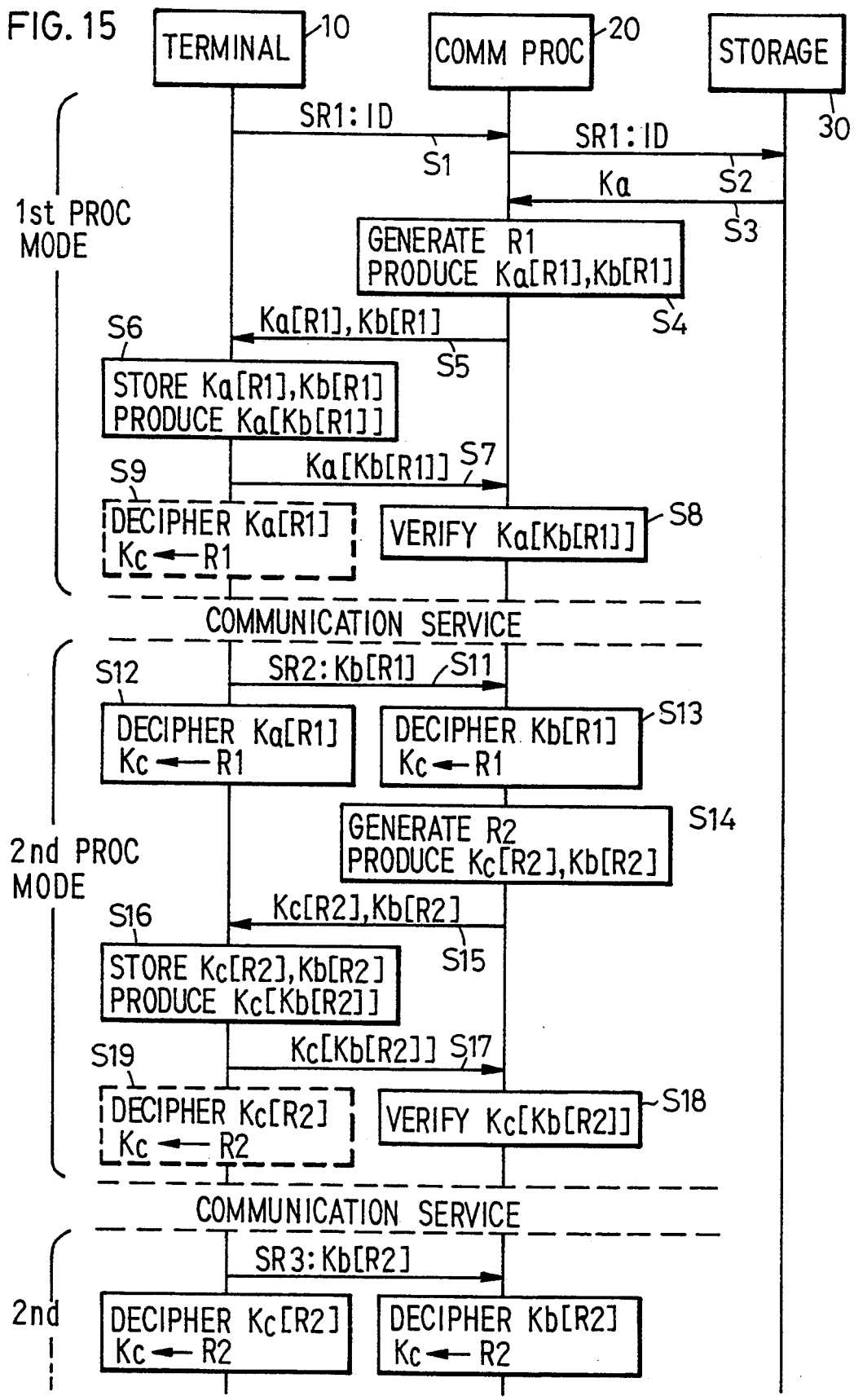

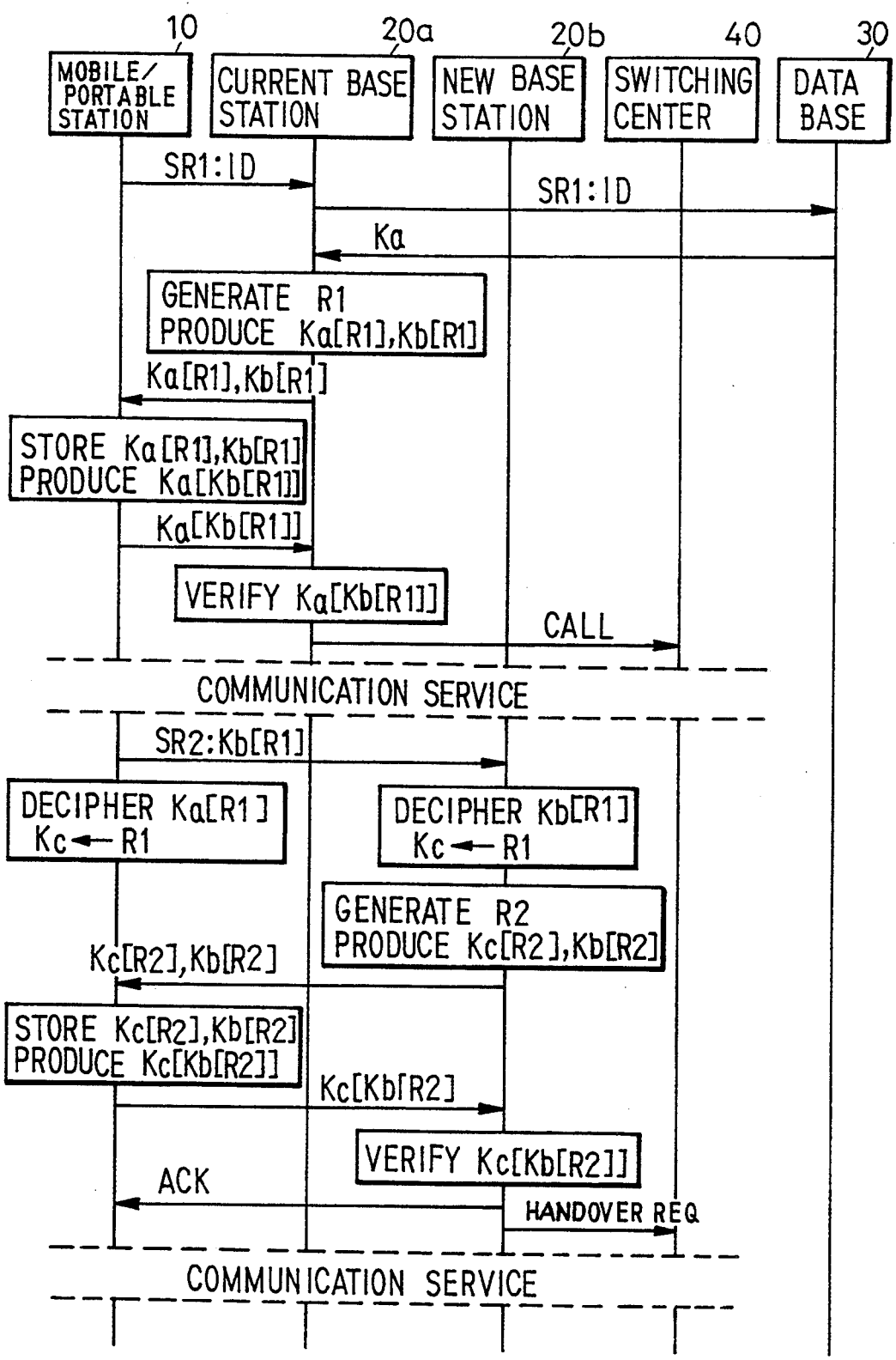

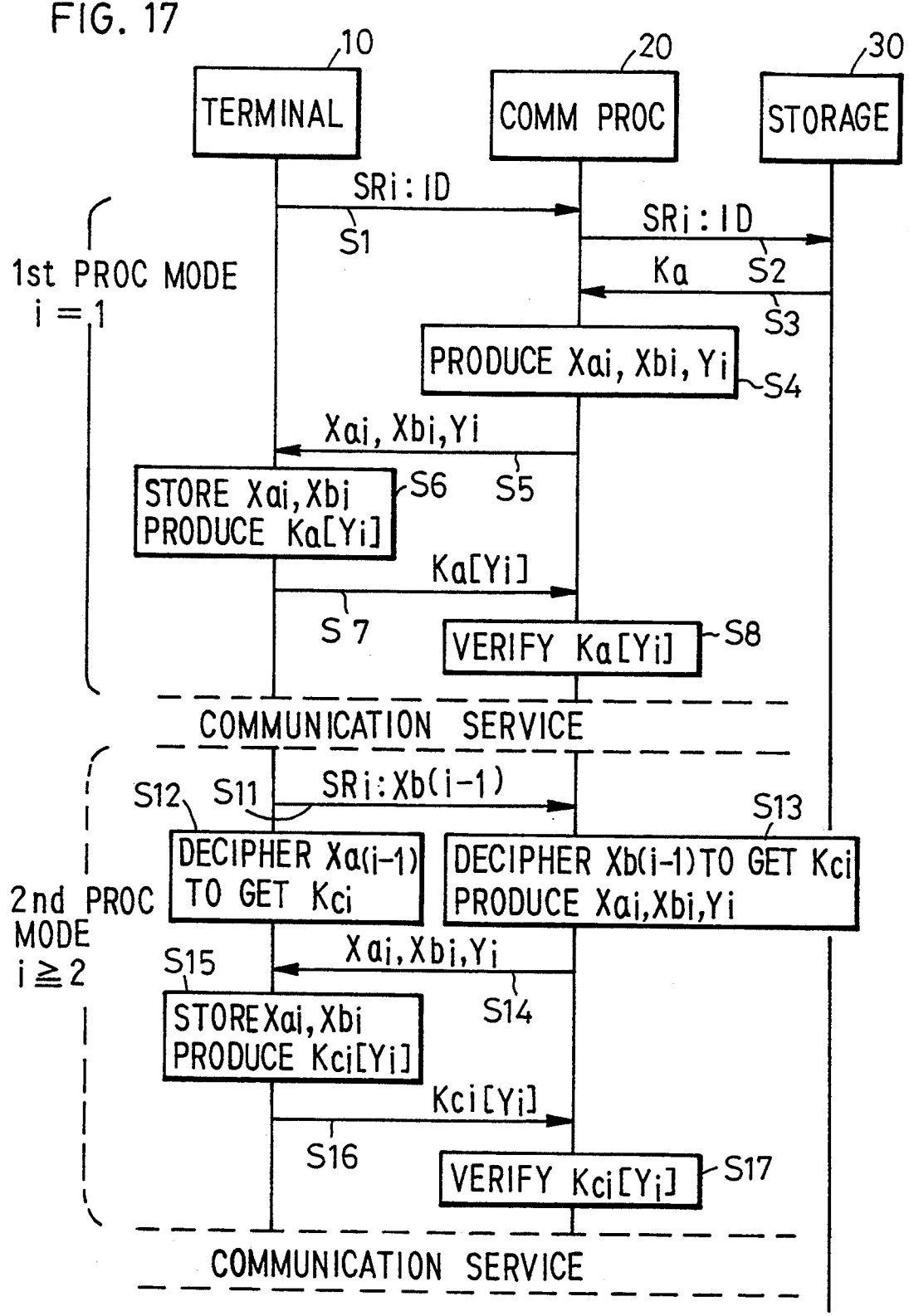

AUTHENTICATION METHOD AND COMMUNICATION TERMINAL AND COMMUNICATION PROCESSING UNIT USING THE METHOD

BACKGROUND OF THE INVENTION

The present invention relates to a communication processing unit, represented by a base station or card reader in a mobile telecommunication system or IC card system, for instance, authenticates a communication terminal which is connected thereto, such as a terminal or IC card, when the communication processing unit grants a service requested by the communication terminal. The invention also pertains to a communication terminal and a communication processing unit using the authentication method.

FIGS. 1A and 1B show, by way of example, systems to which the present invention is applied. In FIG. 1A, each communication terminal 10 is connected via a communication channel 40 to a communication processing unit 20, which is connected via a communication channel 50 to a memory 30. The communication channel 40 is a radio or wired channel. When the communication channel 40 is a radio channel, the system is, for example, a mobile telecommunication system, in which case the communication terminal 10 is a mobile station or portable station and the communication processing unit 20 is a base station or switching center. For instance, in the case of a personal communication system using an ordinary terminal, the communication channel 40 is a wired channel and the communication terminal 10 is a combination of a registered IC card owned by a user and a telephone set into which the user inserts the IC card to receive his requested service, and the communication processing unit 20 is an exchange or switch. In these cases, the communication processing unit grants requested communication services after authenticating the validity of the mobile station, the portable station and the user. As depicted in FIG. 1B, in an IC card system, the communication terminal 10 corresponds to an IC card and the communication processing unit 20 a card reader which reads out and writes data in the IC card inserted thereinto. The card reader grants a service using the IC card after making a check to see if the IC card inserted thereinto is valid.

FIG. 2 shows an authentication method that has been used in these systems. The communication terminal 10 is a terminal such as a telephone, mobile station, portable station or IC card. The communication processing unit 20 is a base station or exchange in a mobile telecommunication system, for example, or an IC card reader. The memory 30 is, for instance, a database which stores information on the communication terminal 10 represented by its authentication key. In the following description an expression in the form of A[B] will mean a computation for enciphering information B by a key A, and to decode a signal A[B] will mean to obtain information B through computation using the key A.

The communication terminals are each preassigned identification information ID and a secret authentication key Ka, and the authentication key Ka of each communication terminal 10 is prestored in the memory 30 in correspondence with the identification information ID. At first, the communication terminal 10 transmits a service request signal SR1 containing the identification information ID (step S1). This corresponds to, for example, the transmission of a call originating signal from a portable station used as the communication terminal 10 when it originates a call. Upon receiving the service request signal SR1, the communication processing unit 20 sends the signal SR1 to the memory 30 and requests it to send the authentication key Ka for authenticating the communication terminal 10, that is, the same authentication key Ka as that which the communication terminal 10 stores in secrecy (step S2). The memory 30 reads out the requested authentication key Ka from the identification information ID in the received service request signal SR1 and sends it to the communication processing unit 20 (step S3). Upon receiving the authentication key Ka from the memory 30, the communication processing unit 20 generates a random number R1 in step S4 and transmits it as an authentication request signal to the communication terminal 10 in step S5. Having received the random number R1, the communication terminal 10 enciphers the random number R1 by use of the authentication key Ka in step S6 and returns the enciphered signal Ka[R1] as an authentication response signal to the communication processing unit 20 in step S7. Then, in step S8 the communication processing unit 20 deciphers the signal Ka[R1], using the authentication key Ka (step 8a) and checks the deciphered signal R1 with the random number R1 previously transmitted to the communication terminal 10 (step 8b). When they match, the communication processing unit 20 decides that the communication terminal 10 is a valid user, and authorizes the requested service to start.

For instance, also in the case where a second service request for handover during communication or hand off during conversation is made during the above-mentioned service, or in the case of the second service being made after the above-said service is finished, a second service request signal SR2 containing the identification information ID is sent to the communication processing unit 20 (step S11), after which the communication terminal 10 is authenticated using exactly the same procedure (steps S12 through S18) as that for the first service request signal SR1.

With the above-described prior art, upon each occurrence of a service request, the communication processing unit 20 needs to acquire the authentication key Ka from the memory 30, and hence the authentication process takes much time accordingly—this leads to a defect that the delay accompanying the start of communication or channel connection increases.

SUMMARY OF THE INVENTION

It is an object of the present invention to provide an authentication method which permits reduction of the time for authentication processing in response to second and subsequent service requests and a communication terminal and a communication processing unit which utilize the authentication method.

The authentication method according to the present invention has a first processing mode for executing an authentication-process in response to a first communication request and a second processing mode for executing an authentication process in response to each of second and subsequent communication request.

In the first processing mode, the communication processing unit responds to a communication request signal from a communication terminal to acquire the authentication key Ka corresponding thereto from a memory and, at the same time, the communication processing unit generates enciphered authentication information Xbi enciphered using its authentication key Kb and random information Yi and transmits these pieces of information Xbi and Yi as an authentication request signal to the communication terminal. The communication terminal enciphers the received random information Yi by the authentication key Ka to obtain information Ka[Yi] and sends it as an authentication response signal back to the communication processing unit and, at the same time, the communication terminal stores the received enciphered authentication information Xbi. The communication processing unit verifies the authentication response signal, using the authentication key Ka.

In the second processing mode, the communication terminal transmits to the communication processing unit a communication request signal containing the previously stored enciphered authentication information Xbi. The communication processing unit deciphers the enciphered authentication information Xbi to generate a deciphered authentication key Kci and, at the same time, transmits to the communication terminal an authentication request signal containing newly generated random information Yi. The communication terminal enciphers the received random information Yi by the authentication key Kci and sends it as an authentication response signal back to the communication processing unit, which verifies the authentication response signal, using the deciphered authentication key Kci.

According to the present invention, since the authentication key that is used for processing all service requests is set between the communication terminal and the communication processing unit in the authentication processing for a first service request, the communication processing unit needs not to acquire the authentication key Ka from the memory when second and subsequent service requests are made. Hence, the present invention permits reduction of the time of the authentication process.

BRIEF DESCRIPTION OF THE DRAWINGS

FIG. 2 is a diagram for explaining a conventional authentication method;

FIG. 3 is a flowchart showing the procedure of the authentication method according to a first embodiment of the present invention;

FIG. 4 is a block diagram illustrating the construction of a communication terminal in FIG. 3;

FIG. 6 is a block diagram illustrating the construction of a communication processing unit in FIG. 3;

FIG. 14 is a diagram showing the authentication procedure in the case of the authentication method of FIG. 9 being applied to a handover during communication or conversation;

FIG. 15 is a flowchart showing the procedure of the authentication method according to a third embodiment of the present invention;

FIG. 16 is a diagram showing the authentication procedure in the case of the authentication method of FIG. 15 being applied to a handover during communication or conversation; and FIG. 17 is a flowchart illustrating the procedure based on the basic principles of the authentication method according to the present invention.

DESCRIPTION OF THE PREFERRED EMBODIMENTS

Figure 1A:
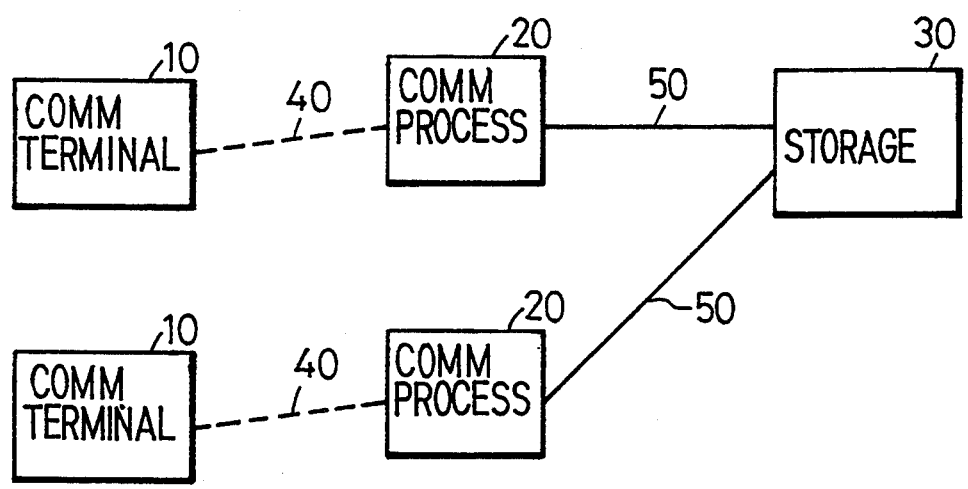
FIG. 1A is a block diagram showing an example of the system to which the present invention is applied.
Figure 1B:
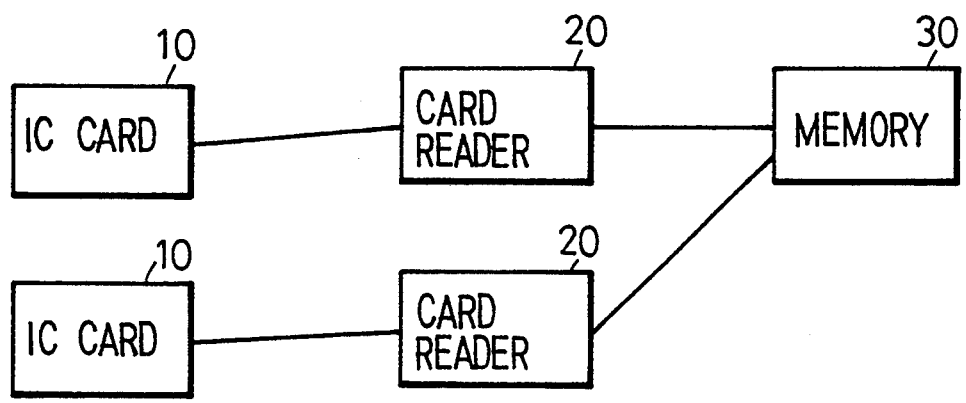
FIG. 1B is a block diagram of another example of the system to which the present invention is applied.

FIG. 3 is explanatory of a basic embodiment of the authentication method according to the present invention. The communication terminal 10, the communication processing unit 20 and the memory 30 correspond to those in the communication system shown in FIG. 1A or the IC card 10, the card reader 20 and the memory (database) 30 in the IC card system depicted in FIG. 1B. Also in the present invention, each communication terminal 10 is preassigned a different identification information ID and a different secret key Ka, and the memory 30 prestores the authentication key Ka corresponding to the identification information ID. In the present invention each communication processing unit 20 has an authentication key Kb common to the other communication processing units. The authentication method according to the present invention has two processing modes. A first processing mode is a processing mode for the signal SR1 of the first service request (a service request 1) and a second processing mode is a processing mode for the signals SR2, SR3, ... of second and subsequent service requests (a service request signal SR2, a service request 3 and so on).

A description will be given first of the first processing mode. In FIG. 3, the communication terminal 10 first transmits the service request signal SR1 containing the identification information ID (step S1). This corresponds to, for instance, the transmission of a call originating signal from the portable station as the communication terminal 10 when it originates a call. Upon receiving the service request signal SR1, the communication processing unit 20 transfers it to the memory 30 (step S2) to request it for the authentication key Ka for authenticating the communication terminal 10, that is, the same authentication key Ka as that which the communication terminal is storing in secrecy. The memory 30 uses the identification information ID in the received signal SR1 to read out the corresponding authentication key Ka and transmits it to the communication processing unit 20 (step S3). Upon receiving the authentication key Ka from the memory 30, the communication processing unit 20 generates the random number R1 and enciphers the received authentication key Ka by the authentication key Kb in step S4, after which the communication processing unit 20 transmits the enciphered signal Kb[Ka] and the random number R1, as an authentication request signal, to the communication terminal 10 in step S5. The process of generating the random number R1 in step S4 may be performed at any time in the period from the reception of the service request signal SR1 to the transmission of the random number R1 in step S5. Upon receiving the enciphered signal Kb[Ka] and the random number R1, the communication terminal 10 stores the signal Kb[Ka] and enciphers the received random number R1 by the authentication key Ka in step S6 and, in step S7, sends the enciphered signal Ka[R1] as an authentication response signal back to the communication processing unit 20. Then, the communication processing unit 20 verifies the validity of the response signal Ka[R1], using the authentication key Ka and the random number R1 (step S8). The verification in step S8 is conducted by deciphering the received response signal Ka[R1] by the authentication key Ka and matching the deciphered signal R1 with the random number R1 sent to the communication terminal 10. Alternatively, the random number R1 sent to the communication terminal 10 is enciphered by use of the authentication key Ka and the enciphered signal Ka[R1] is matched with the response signal Ka[R1] received from the communication terminal 10. These two methods are equivalent to each other, and hence either of them may be used. If it is found that the both signals match, then the communication processing unit decides that the communication terminal 10 is a valid subscriber, and starts a communication connecting process (the requested service). This is the authentication procedure in the first processing mode.

Next, the second processing mode will be described. This is processing that is performed, for example, in the case where the communication terminal 10 makes a second service request for a handover (channel switching during communication) in the middle of the communication connected in the first processing mode or after completion of the communication service in the first processing mode. The communication terminal 10 transmits, as a service request signal SR2, a signal containing the enciphered signal Kb[Ka] stored in the afore-mentioned step S6 and a mode specifying signal M which indicates the second processing mode (step S11). The communication processing unit 20 receives the service request signal SR2 and when it recognizes from the mode specifying signal M in the signal SR2 that the service request from the communication terminal 10 is a service request in the second processing mode, the communication processing unit 20 deciphers the signal Kb[Ka] by use of the authentication key Kb to obtain the authentication key Ka and generates a random number R2 (step S12) and transmits the random number R2 as an authentication request signal to the communication terminal 10 (step S13). Upon receiving the authentication request signal, the communication terminal 10 generates a signal Ka[R2] by enciphering the random number R2 with the authentication key Ka (step S14) and sends it as an authentication response signal back to the communication processing unit 20 (step S15). As in the verification step S8 of the first processing mode, the communication processing unit 20 verifies the validity of the response signal Ka[R2] by use of the authentication key Ka and the random number R2 (step S16). That is, the signal Ka[R2] is deciphered by the authentication key Ka and the deciphered signal R2 is matched with the random number R2 previously transmitted to the communication terminal 10; alternatively, the random number R2 generated in step S12 is enciphered by the authentication key Ka and the enciphered signal Ka[R2] is matched with the response signal Ka[R2] received from the communication terminal 10. If they match, then it is decided that the communication terminal 10 is a valid subscriber, and the requested communication service is initiated.

When the communication terminal 10 further transmits third and subsequent service signals SR3, SR4, ..., signal processing is performed following the same procedure as that of the second processing mode described above.

FIG. 4 illustrates, in block form, an example of the construction of the communication terminal 10 in the FIG. 3 embodiment. The communication terminal 10 is formed as an IC card, for instance, and has an I/O interface 13, a computation part 14, a memory 15 and a control part 16, which are interconnected via a bus 17. The communication terminal 10 further has a transmitting part 11 and a receiving part 12 both connected to the I/O interface 13 for signal transmission and reception between it and the communication processing unit 20. In FIG. 4, a display 18 is shown to be connected to the I/O interface 13, but when the communication terminal 10 is an IC card, the display 18 may also be provided on, for example, a terminal set into which the IC card is inserted.

The memory 15 has an area 15A for storing the authentication key Ka and the identification information ID preassigned to the communication terminal 10, an area 15B for temporarily storing data such as the received enciphered signal Kb[Ka] and the results of computation, an area 15C in which an overall authentication procedure in the communication terminal 10 (the procedure described later with respect to FIG. 5) is described, and an area 15D which has stored therein a program for enciphering the received random number by the authentication key Ka. The control part 16 performs signal processing using the procedure described in the area 15C and the computation part 14 performs the computation for generating the enciphered signal Kb[Ka] using the computation procedure in the area 15D.

Figure 5:
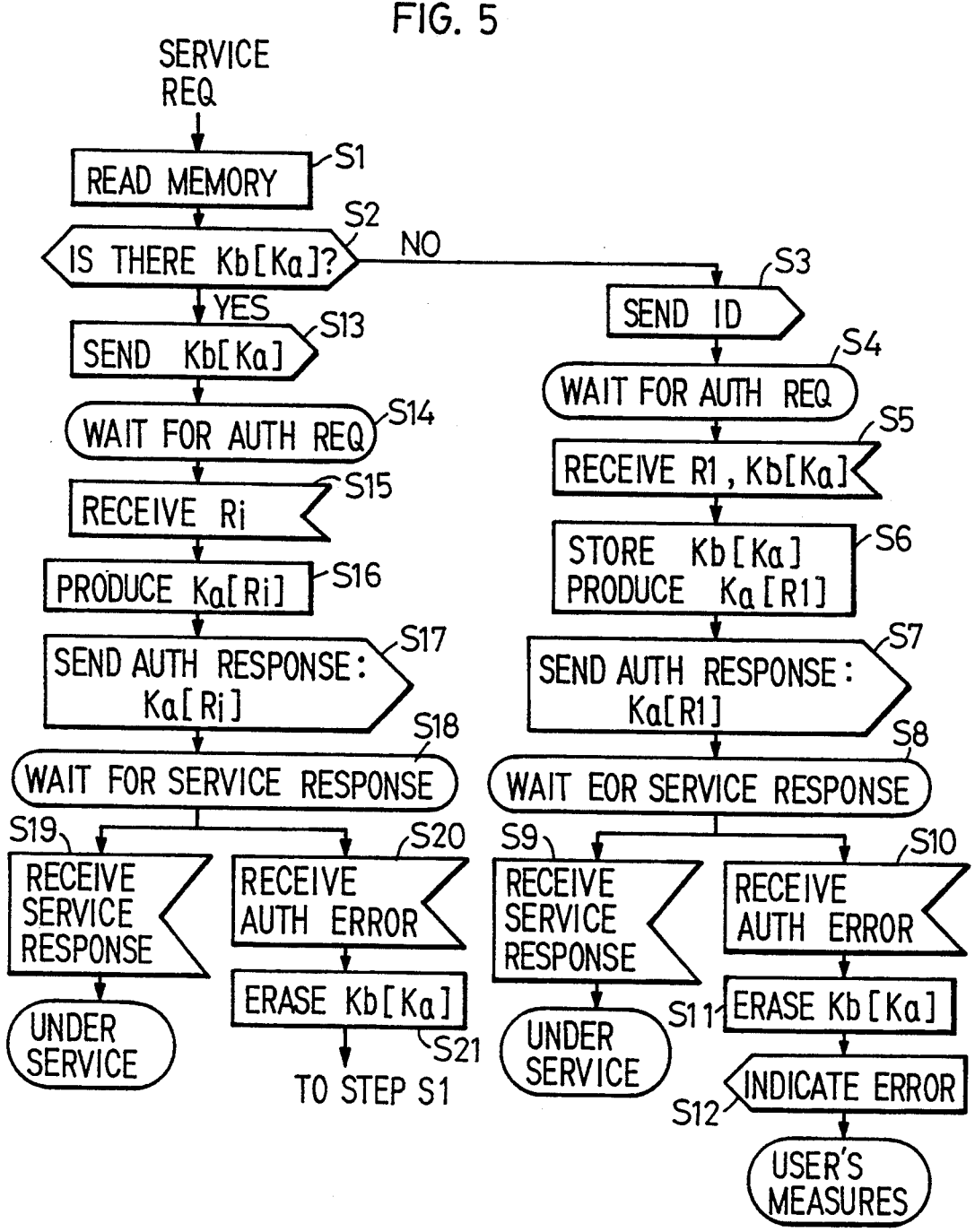
FIG. 5 is a flowchart showing the authentication procedure of the communication terminal shown in FIG. 4.

FIG. 5 shows an example of the procedure stored in the memory area 15C in FIG. 4 which is performed by the communication terminal 10.

When a user conducts an operation for requesting the communication terminal 10 to provide a service by, for example, inserting the IC card into a mobile station or portable station, the communication terminal 10 reads out the stored contents of the memory area 15B in step S1. Upon receiving the service request, the communication terminal 10 makes a check in step S2 to see if it has already stored in the memory area 15B the enciphered signal Kb[Ka] received from the communication processing unit 20. If not, then the communication terminal 10 concludes that the first processing mode should be executed, and it proceeds to step S3.

In step S3 the communication terminal 10 generates the first service request signal SR1 containing the user identifying information ID and a mode signal M1 indicating the first processing mode and transmits the signal SR1 to the communication processing unit 20, then entering an authentication request wait state in step S4. Upon receiving the random number R1 and the enciphered signal Kb[Ka] as an authentication request signal from the communication processing unit 20 in step S5, the communication terminal 10 stores the signal Kb[Ka] in the memory area 15B and generates a signal Ka[R1] by enciphering the random number R1 with the authentication key Ka in the computation part 14 in step S6. In the next step S7 the communication terminal 10 transmits the signal Ka[R1] as the authentication response signal to the communication processing unit 20, and in step S8 the communication terminal 10 enters a service response waiting state. When the communication processing unit 20 concludes that the authentication response signal Ka[R1] is valid, it starts a call connection process, and upon receiving a service response in step S9, the communication terminal 10 goes into a service receiving state. In the case where the communication processing unit 20 concludes that the authentication response signal Ka[R1] is invalid, the communication terminal 10 receives an authentication error signal from the communication processing unit 20 in step S10, then erases the data Kb[Ka] in the memory area 15B in step S11 and provides an authentication error display on the display 18 in step S12. When the authentication error display is produced, there is the possibility of the communication terminal 10 being faulty or forged; hence the user is supposed to report the abnormality of the communication terminal 10 to a management center of the communication system.

When it is found in step S2 that the communication terminal 10 holds the signal Kb[Ka] from the communication processing unit 20 in the memory area 15B, the communication terminal 10 concludes that the second processing mode should be executed, and then proceeds to step S13.

In step S13 the communication terminal 10 generates the second service request signal SR2 containing a mode signal M2 indicating the second processing mode and the signal Kb[Ka] held in the memory area 15B and sends it to the communication processing unit 20, after which the terminal 10 goes into an authentication request waiting state in step S14. When receiving a random number R2 as an authentication request signal from the communication processing unit 20 in step S15, the communication terminal 10 generates an enciphered signal Ka[R2] by enciphering the random number R2 under the authentication key Ka in step S16 and transmits the signal Ka[R2] as an authentication response signal to the communication processing unit 20 in step S17. In step S18 the communication terminal 10 enters a state of waiting for a service response from the communication processing unit 20.

When the communication processing unit 20 concludes that the authentication response signal Ka[R2] is valid, the communication terminal 10 receives the service response in step S19, entering the service receiving state. When the communication processing unit concludes that the authentication response signal Ka[R2] is invalid, it transmits an authentication error signal to the communication terminal 10. Upon receiving the authentication error signal in step S20, the communication terminal 10 erases the signal Kb[Ka] in the memory area 15B in step S21 and then returns to step S1 to repeat the process. Since the signal Kb[Ka] in the memory area 15B has already been erased at this time, the first processing mode is executed.

FIG. 6 illustrates, in block form, the construction of the communication processing unit 20 in the FIG. 3 embodiment. The basic construction of the communication processing unit 20 is similar to the construction of the communication terminal 10 depicted in FIG. 4. The communication processing unit 20 has, for instance, an I/O interface 23, a computation part 24, a memory 25 and a control part 26, which are interconnected via a bus 27. The communication processing unit 20 further has a transmitting part 21 and a receiving part 22 both connected to the I/O interface 23 for signal transmission and reception between it and the communication processing unit 20. The memory 25 has: an area 25A for storing the authentication key Kb common to all the communication processing units 20 of the system; an area 25B for temporarily storing data such as the enciphered signal Kb[Ka] and the random number generated by the communication processing unit 20 and the authentication key Ka received from the communication terminal 10; an area 25C which has described therein an overall authentication procedure of the communication processing unit 20 (the procedure described later in connection with FIG. 7); an area 25D which has stored therein a program for enciphering the authentication key Ka received from the communication terminal 10 under the common authentication key Kb through computation; an area 25E which has stored therein a deciphering computation program for deciphering the authentication response signal Kb[Ka] to obtain the key Ka; an area 25F which has stored therein a random number generating computation program; and an area 25G which has stored therein a verification program for verifying the validity of the authentication response signal. The control part 26 performs signal processing using the procedure described in the memory area 25C. The computation part 24 responds to an instruction from the control part 26 to perform an enciphering computation for generating the enciphered signal Kb[Ka] following the computation procedure in the memory area 25D or deciphering computation following the computation procedure in the memory area 25E, generates the random number using the computation procedure in the memory area 25F and verifies the authentication response signal using the computation procedure in the memory area 25G.

Figure 7:
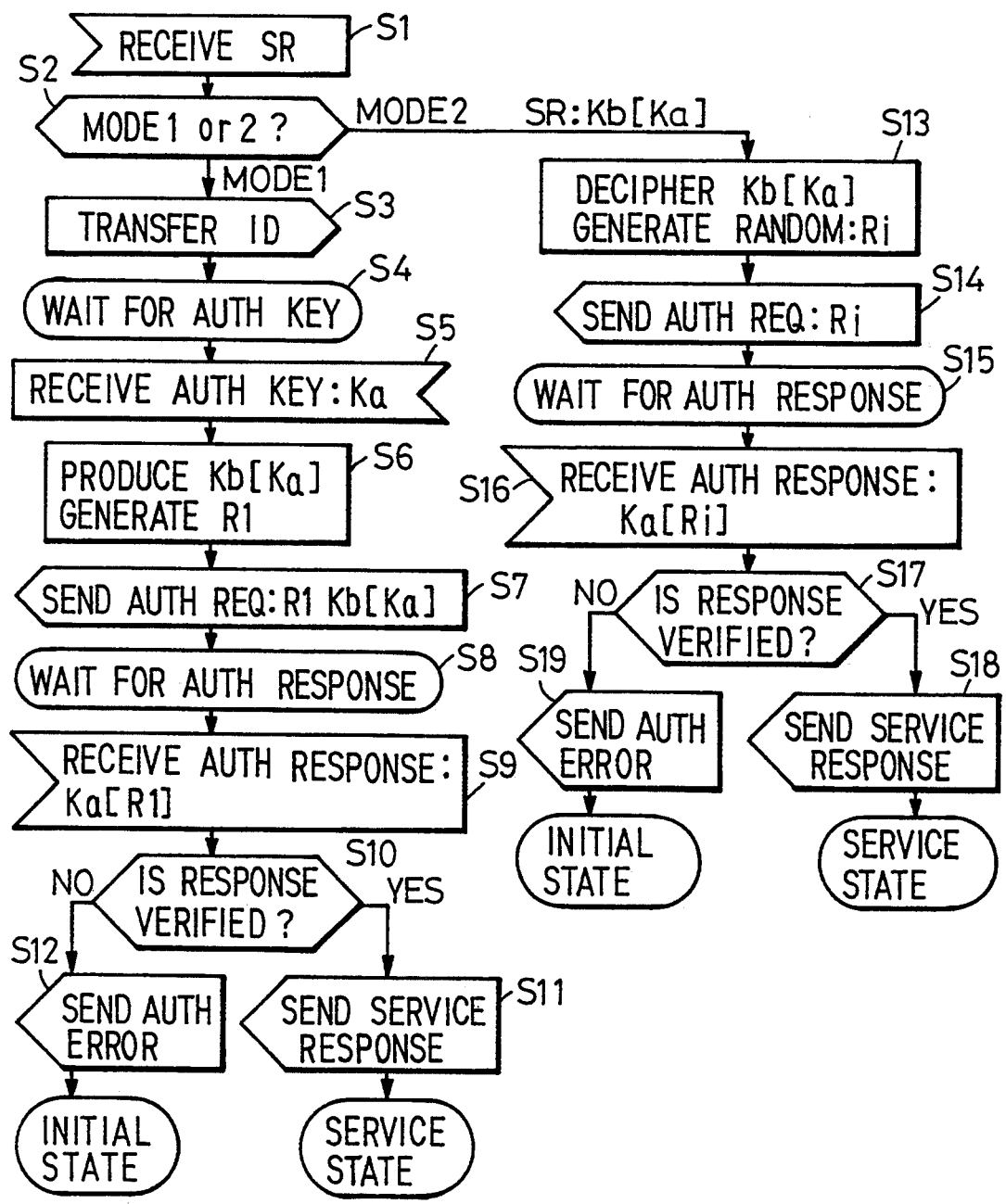
FIG. 7 is a flowchart showing the authentication procedure of the communication processing unit depicted in FIG. 6.

FIG. 7 shows an example of the authentication procedure stored in the memory area 25C in FIG. 6 which is executed by the communication processing unit 20.

Upon receiving a service request signal SR from the communication terminal 10 in step S1, the communication processing unit 20 determines in step S2 if the mode specifying signal M in the signal SR indicates the first or second processing mode. If the first processing mode is indicated, then the communication processing unit 20 sends the service request signal SR containing the identification information ID to the memory 30 in step S3, after which it waits for the return therefrom the authentication key Ka corresponding to the communication terminal 10 in step S4. When receiving the authentication key Ka corresponding to the identification information ID from the memory 30 in step S5, the communication processing unit 20 stores it in the memory area 25B. In the next step S6 the communication processing unit 20 generates the enciphered signal Kb[Ka] by enciphering the authentication key Ka under the authentication key Kb in the computation part 24 using the enciphering procedure described in the memory area 25D, the enciphered signal Kb[Ka] being stored in the memory area 25B. In the next step S7 the communication processing unit 20 transmits a set of the enciphered signal Kb[Ka] and the random number R1, as an authentication request signal, to the communication terminal 10 and in step S8 waits for an authentication response therefrom. Upon receiving the authentication response signal Ka[R1] from the communication terminal 10 in step S9, the communication processing unit 20 responds to an instruction from the control part 26 in step S10 to determine if the authentication response signal Ka[R1] is valid, by the computation part 24 using the procedure described in the memory area 25G. If the authentication response signal Ka[R1] is valid, the communication processing unit 20 transmits a service response signal to the communication terminal 10 in step S11, entering a service state. If the authentication response signal Ka[R1] is found invalid, then the communication processing unit 20 sends the authentication error signal to the communication terminal 10 in step S12 and goes into the initial state.

In the case where the mode specifying signal M indicated the second processing mode in step S2, the service request is an i-th (where $i \geq 2$) or subsequent service request and the service request signal SR contains the enciphered signal Kb[Ka] returned from the communication terminal 10, which is stored in the memory area 25B. In step S13 the computation part 24 responds to an instruction from the control part 26 to generate a random number Ri following the random number generating procedure described in the memory area 25F. In step S14 the communication processing unit 20 sends the random number Ri as the authentication request signal to the communication terminal 10 and, in step S15, waits for an authentication response signal therefrom. Upon receiving the authentication response signal Ka[Ri] in step S16, the communication processing unit 20 verifies the validity of the authentication response signal Ka[Ri] in step S17 following the procedure stored in the memory area 25G. If the authentication response signal Ka[Ri] is found valid, then the communication processing unit 20 sends a service response signal to the communication terminal 10 in step S18 and enters the service state. When the signal Ka[Ri] is found invalid, the communication processing unit 20 sends the authentication error signal to the communication terminal 10 in step S19 and returns to the initial state.

As referred to previously with respect to FIG. 3, two methods can be used to verify the validity of the authentication response signal Ka[Ri] in steps S10 and S17 shown in FIG. 7. According to one of the two methods, the random number Ri is obtained by deciphering the authentication response signal Ka[Ri] under the authentication key Ka stored in the memory area 25B and it is determined that the authentication response signal is valid when the deciphered signal Ri matches the counterpart Ri stored in the memory area 25B. According to the other method, a signal Ka[Ri] is generated by enciphering the random number Ri under the authentication key Ka through use of the authentication key Ka and the random number Ri stored in the memory area 25B and it is determined that the authentication response signal Ka[Ri] is valid when the enciphered signal Ka[Ri] matches it. These two methods are equivalent to each other and either of them may be used.

Figure 8:
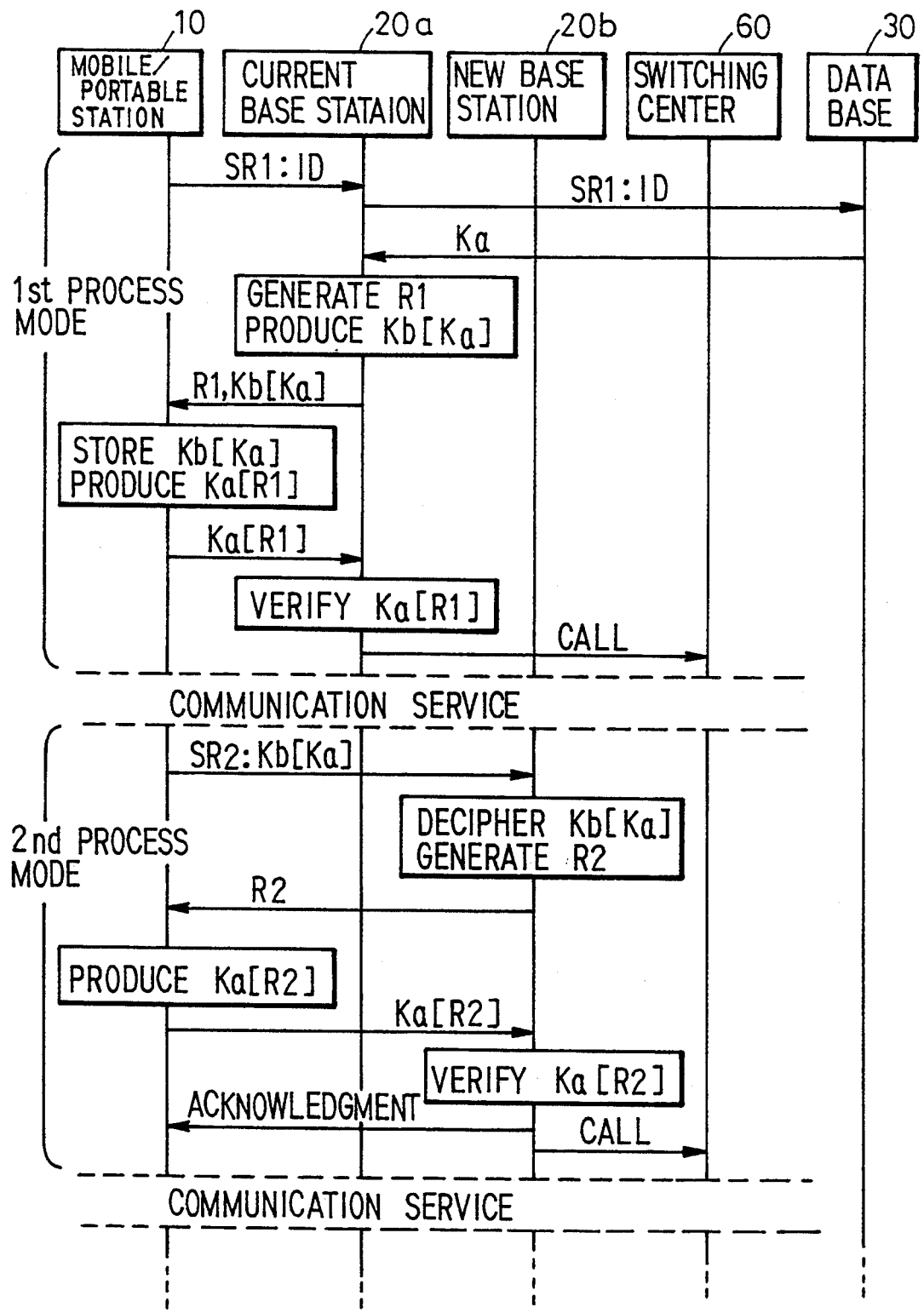
FIG. 8 is a diagram showing the authentication procedure in the case of the authentication method of FIG. 3 being applied to hand off during conversation.

FIG. 8 shows an authentication procedure for use in the case of applying the FIG. 3 embodiment to a channel switching during communication (handover) in mobile telecommunication. A mobile station 10 corresponds to the communication terminal 10. A base station 20a with which the mobile station 10 is in communication (which base station will hereinafter be referred to as a current base station) and a base station 20b to which the mobile station 10 is switched (which base station will hereinafter be referred to as a new station) correspond to the-communication processing unit 20 in FIG. 3. The base stations each have a common authentication key Kb. A data base 30 corresponds to the storage 30 in FIG. 3. The base stations 20a and 20b belong to a switching center 60. In this example, a call originating process corresponds to the first processing mode and a handover (channel switching during communication) the second processing mode.

At first, the terminal 10 transmits a cell originating signal SR1 containing its identification information ID to the base station 20a in a radio zone to which the base station 20a belongs. The signal SR1 corresponds to the first service request signal SR1 from the communication terminal 10 in FIG. 3. Thereafter, authentication is carried out using the same procedure as that of the first processing mode M1 described previously with reference to FIG. 3 and then the requested communication service is started. When the mobile terminal 10 moves out of the current radio zone and into another to which te base station 20b belongs, the handover is performed so as to continue communication. In this case, in order that the terminal 10 detects the zone switching and performs the handover, the terminal 10 transmits to the new base station 20b a handover request signal SR2 containing the signal Kb[Ka] stored by the terminal 10. The new base station 20b deciphers the handover request signal SR2 to obtain the authentication key Ka and generates the random number R2, which are sent as an authentication request signal to the terminal 10. The terminal 10 transmits, as an authentication response signal, the signal Ka[R2] obtained by enciphering the random number R2 under the authentication key Ka, to the new base station 20b. Upon completion of the authentication, the new base station 20b sends a handover acceptance signal to the terminal 10, which recognizes therefrom completion of the authentication procedure.

In the above, the mode specifying signal M for distinguishing between the first and second processing modes may be inserted in the signal that is sent from the terminal 10 to the communication processing unit 20; alternatively, the first and second processing modes may be distinguished according to the presence or absence of the signal Kb[Ka]. While in the above embodiments the terminal identifying information ID has been described to be held in the terminal 10, it is also possible that the user inputs the identification information ID into the terminal when using it.

Figure 9:
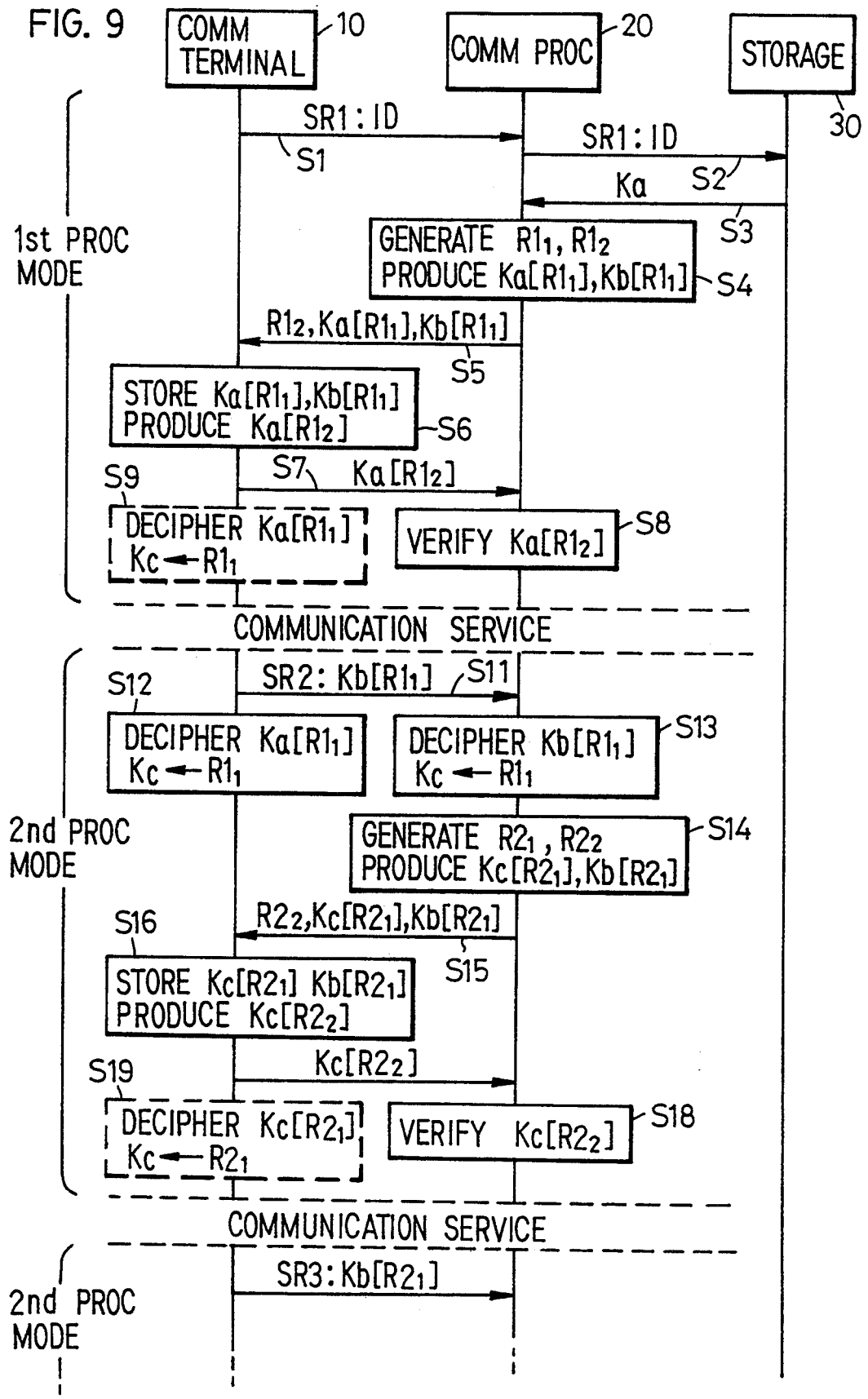
FIG. 9 is a flowchart showing the procedure of the authentication method according to a second embodiment of the present invention.

As described above, according to the FIG. 3 embodiment, in the case of executing the first processing mode for the first service request, once the communication processing unit 20 reads out the authentication key Ka from the storage 30, it needs not to access the storage 30 in the second processing mode for the second and subsequent service requests, and hence the processing time can be reduced. Incidentally, the FIG. 3 embodiment always employs the same enciphered signal Kb[Ka], as the service request signal for the second and subsequent service requests. Such a repeated use of the same information is not preferable, because it incurs possibility of the authentication keys Ka and Kb being deciphered in the event that communication between the communication terminal 10 and the communication processing unit 20 is wiretapped. FIG. 9 shows a basic procedure of an authentication method which deviates this defect of the FIG. 3 embodiment.

The embodiment of the authentication method shown in FIG. 9 also uses two processing modes as is the case with FIG. 3. The first processing mode is a mode of processing for the first service request signal SR1, and the second processing mode is a mode of processing for second and subsequence service request signals SR2, SR3, . . . Also in this embodiment, the communication terminals 10 are each preassigned the authentication key Ka and the identification information ID that are unique to the terminal 10, and the storage 30 has stored therein the authentication key Ka corresponding to the identification information ID of each communication terminal 10. The respective communication processing units 20 are preassigned a common authentication key Kb.

In the first processing mode, the communication terminal 10 first transmits the service request signal SR1 containing the identification information ID to the communication processing unit 20 (step S1). The communication processing unit 20 sends the signal SR1 to the storage 30 (step S2), requesting the authentication key Ka that is used to authenticate the communication terminal 10. The storage 30 reads out the authentication key Ka corresponding to the identification information ID in the signal SR1 and sends it back to the communication processing unit 20 (step S3). Upon receiving the authentication key Ka from the storage 30, the communication processing unit 20 stores it in step S4 and, at the same time, generates a pair of random numbers $R1_1$ and $R1_2$ and further generates, through computation, a signal $Ka[R1_1]$ into which the random number $R1_1$ has been enciphered by the authentication key Ka and a signal $Kb[R1_1]$ into which the random number $R1_1$ has been enciphered by the authentication key Kb of the communication processing unit 20.

In step S5 the communication processing unit 20 transmits these enciphered signals to the communication terminal 10 together with the random number $R1_2$. The computation for generating the pair of random numbers $R1_1$ and $R1_2$ in step S4 may conducted at any time from the time after the reception of the service request signal SR1 to the time prior to the enciphering of the random number $R1_1$. When receiving the enciphered signals $Ka[R1_1]$ and $Kb[R1_1]$ and the random number $R1_2$, the communication terminal 10 stores therein the signals $Ka[R1_1]$ and $Kb[R1_1]$ in step S6 and, at the same time, obtains a signal $Ka[R1_2]$ by enciphering the received random number $R1_2$ under the authentication key Ka. Next, the communication terminal 10 returns the enciphered signal $Ka[R1_2]$ as an authentication response signal to the communication processing unit 20 in step S7. The communication processing unit 20 verifies the validity of the authentication response signal $Ka[R1_2]$ using the authentication key Ka and the random number $R1_2$ in step S8. In this case, two method can be used for this authentication as referred to previously in respect of the FIG. 3 embodiment. That is, the authentication response signal $Ka[R1_2]$ is deciphered by the authentication key Ka to obtain the random number $R1_2$, which is matched with the random number $R1_2$ previously sent to the communication terminal 10. Alternatively, the signal $Ka[R1_2]$ obtained by enciphering under the authentication key Ka the random number $R1_2$ sent to the communication terminal 10 is matched with the signal $Ka[R1_2]$ received from the communication terminal 10. If they match, it is concluded that the communication terminal 10 is a valid subscriber, and the requested service is initiated. This is the authentication procedure in the first processing mode.

Next, the second processing mode will be described. This corresponds to the processing that is needed, for instance, in the case of a second service request being made after completion of the communication service connected in the first processing mode, or the case of a second service request such as a handover being made during the communication service connected in the first processing mode. The communication terminal 10 transmits the second service request signal SR2 in step S11. The signal SR2 contains the mode specifying signal M indicating the second processing mode and the signal $Kb[R1_1]$ that the communication terminal 10 received and stored therein during the processing for the previous service request signal SR1 in the first processing mode. In step S12 the communication terminal 10 obtains the random number $R1_1$ by deciphering under its authentication key Ka the signal $Ka[R1_1]$ stored in step S6 in the first processing mode. The random number $R1_1$ is used as a temporary authentication key Kc for the current service request.

Incidentally, in the FIG. 9 embodiment, upon commencement of the service request in the second processing mode, the temporary authentication key Kc to be used for the authentication processing responsive to the service request is updated as shown in step S12, but it is also possible that in the authentication processing for the immediately preceding service request, the authentication key Kc is updated in preparation for the next service request after step S5 as in step S9 indicated by the broken line in the first processing mode in FIG. 9, for instance. In such a case, the authentication key Kc is pre-updated for use in the authentication processing for the next service request, in the broken-lined step S19 after step S17 in the second processing mode.

On the other hand, when the communication processing unit 20 recognizes from the mode specifying signal M in the received service request signal SR2 that the service request is a request in the second processing mode, it obtains the random number $R1_1$ by deciphering the signal $Kb[R1_1]$ in the received signal SR2 through use of the authentication key Kb in step S13 and stores the random number $R1_1$ as the temporary authentication key Kc for the current service request. Then in step S14 the communication processing unit 20 generates a pair of random numbers $R2_1$ and $R2_2$ and, further, generates a signal $Kc[R2_1]$ by enciphering the random number $R2_1$ under the temporary authentication key Kc and a signal $Kb[R2_1]$ by enciphering the random number $R2_1$ under the authentication key Kb. Next, in step S15 the communication processing unit 20 transmits these enciphered signal as an authentication request signal to the communication terminal 10, together with the random number $R2_2$. Upon receiving the authentication request signal, the communication terminal 10 stores the received signals $Kc[R2_1]$ and $Kb[R2_1]$ in step S16 and enciphers the received random number $R2_2$ using the temporary authentication key Kc created in step S12, thereafter sending the enciphered random signal $Kc[R2_2]$ as an authentication response signal back to the communication processing unit 20 in step S17. The communication processing unit 20 verifies the validity of the received response signal $Kc[R2_2]$ in step S18. That is, the signal $Kc[R2_2]$ is deciphered using the temporary authentication key Kc obtained in step S13 and the deciphered signal $R2_2$ is matched with the random number $R2_2$ sent to the communication terminal 10 in step S15. Alternatively, a signal $Kc[R2_2]$ obtained by enciphering the random number $R2_2$ sent to the communication terminal 10, through use of the temporary authentication key Kc is matched with the signal $Kc[R2_2]$ received from the communication terminal 10. If they match, the communication processing unit 20 concludes that the communication terminal 10 is a valid subscriber, and starts the requested communication service.

Where the communication terminal 10 makes third, fourth, . . . service requests afterward, the second processing mode is performed. Upon each processing for such a service request, the communication terminal 10 obtains a signal $R(i-1)_1$ by deciphering the enciphered signal $Kc[R(i-1)_1]$ stored in step S16 in the processing for the previous service request, in step S12 in the processing for the current service request and updates the temporary authentication key Kc to $R(i-1)_1$. The communication processing unit 20 renders the one random number $R(i-1)_1$ created in the previous processing to the current temporary authentication key $Kc=R(i-1)_1$ in step S13 and then generates a new pair of random numbers $Ri_1$ and $Ri_2$. Thus, the temporary authentication key Kc is updated each time a new service request is made, but the authentication procedure is identical with the authentication procedure in the second processing mode shown in FIG. 9. As referred to previously, the updating of the temporary authentication key Kc in the processing for an i-th (where $i \geq 2$) service request may be carried out immediately prior or subsequent to the authentication response step (S7 or S17) in the processing for the preceding (i−1)th service request.

Figure 10:
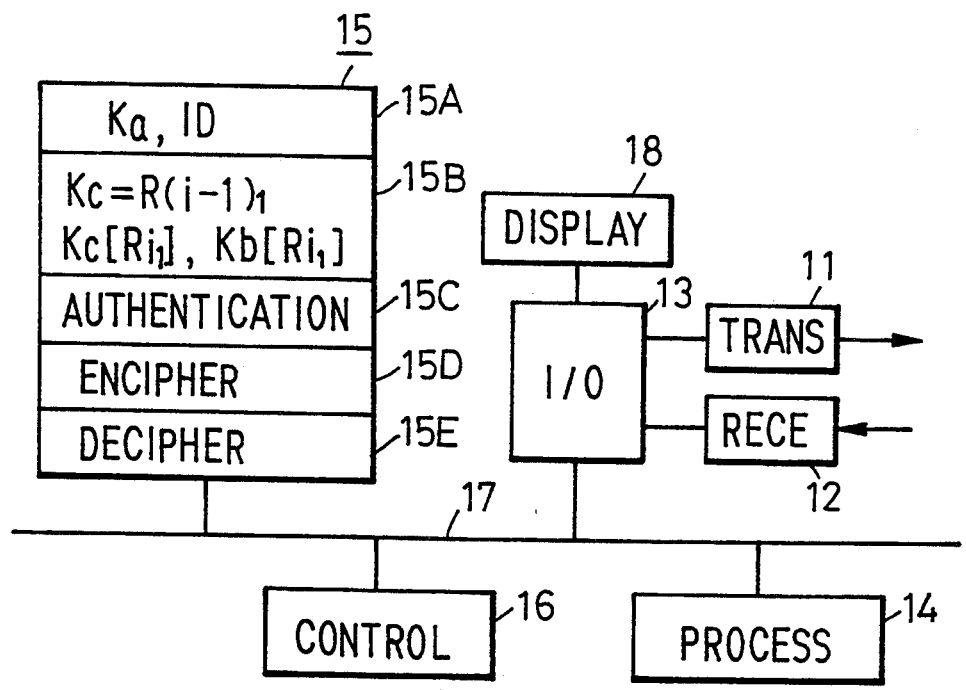
FIG. 10 is a block diagram illustrating an example of the construction of a communication terminal depicted in FIG. 9.

FIG. 10 illustrates, in block form, an example of the construction of the communication terminal 10 in FIG. 9, which is basically identical with the terminal 10 depicted in FIG. 4. In FIG. 10 the communication terminal 10 comprises the transmitting part, the receiving part 12, the I/O interface 13, the computation part 14, the storage 15, the control part 16, the bus 17 and the display 18. In the area 15A of the storage 15 there are stored the authentication key Ka and identification information ID unique to the communication terminal 10. In this embodiment, pieces of data $Kb[Ri_1]$ and $Kc[Ri_1]$ that are received as an authentication request signal from the communication processing unit 20 are stored in the storage area 15B in the processing corresponding to an i-th service request signal SRi. In this instance, when $i=1$, $Kc=Ka$, and when $i \geq 2$, $Kc=R(i-1)_1$. In the storage area 15C there is loaded a program for executing the authentication procedure in the communication terminal 10 in the FIG. 9 embodiment that will be described below in connection with FIG. 11. In the storage area 15D there is stored a program for executing the enciphering computation $Kc[Ri_2]$ in steps S6 and S16 in FIG. 9. In the storage area 15E there is stored a program for executing the computation for deciphering $R(i-1)_1$ from the signal $Kc[R(i-1)_1]$ in step S12 in FIG. 9.

Figure 11:
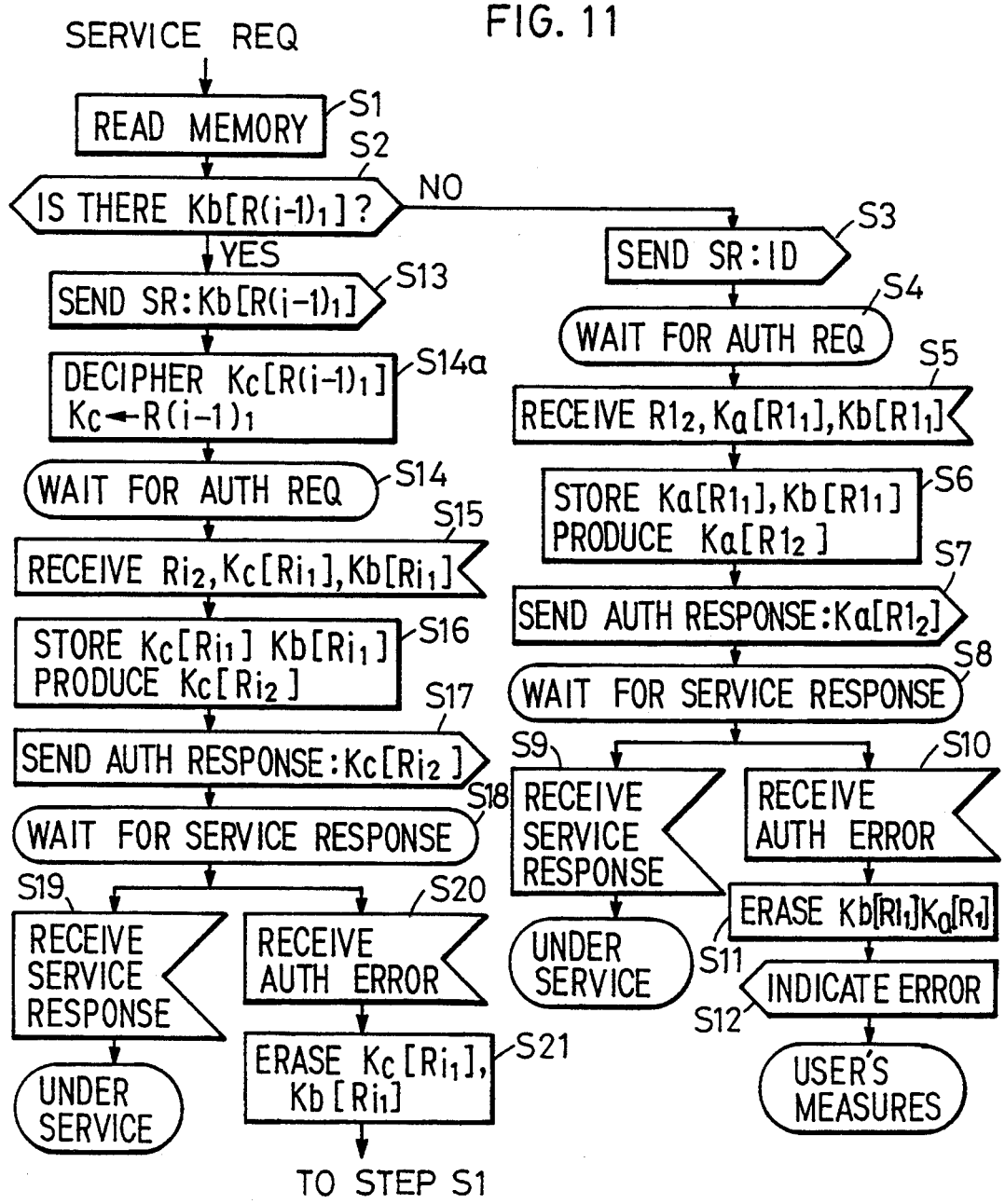
FIG. 11 is a flowchart showing the authentication procedure of the communication terminal depicted in FIG. 9.

FIG. 11 illustrates an example of the authentication procedure that the communication terminal 10 performs in the FIG. 9 embodiment. As is evident from FIG. 11, this procedure is substantially the same as that shown in FIG. 5, except that the contents of information to be processed in each step are different from those in the FIG. 3 embodiment and that step S14a, which executes step S12 for updating the temporary authentication key Kc in FIG. 9, is provided next to step S13 in the second processing mode in the FIG. 11 embodiment.

When a service request is made, the communication terminal 10 makes a check in step S1 to see if the signals $Kc[Ri_1]$ and $Kb[Ri_1]$ have already been stored as the previous authentication request signal in the storage area 15B. If not, the service request is a first request and the terminal 10 executes steps S3 through S12 in the first processing mode. That is, in step S3 the communication terminal 10 sends the first service request signal SR1 containing the identification information ID to the communication processing unit 20 and waits for an authentication request in step S4. Upon receiving the enciphered signals $Ka[R1_1]$ and $Kb[R1_1]$ and the random number $R1_2$, as the authentication request signal from the communication processing unit 20 in step S5, the communication terminal 10 stores these enciphered signals in the storage area 15B and obtains a signal $Ka[R1_2]$ by enciphering the random number $R1_2$ under the authentication key Ka stored in the storage area 15B in step S6. In step S7 the communication terminal 10 sends the enciphered signal $Ka[R1_2]$ as an authentication response signal to the communication processing unit 20 and then enters a service response waiting state in step S8. Where it is verified in the communication processing unit 20 that the authentication response signal is valid, the communication terminal 10 receives a service response signal in step S9 and goes into a service receiving state. When it is not verified that the authentication response signal is valid, the communication terminal 10 receives an authentication error signal from the communication processing unit 20 in step S10, then erases the signals $Ka[R1_1]$ and $Kb[R1_1]$ in the storage area 15B in step S11 and provides an error display on the display 18 in step S12. In this instance, the user reports the abnormality of the communication terminal 10 to the management center of the telecommunication system.

In the case where it is concluded in step S2 that the signals $Kc[Ri_1]$ and $Kb[Ri_1]$ as the previous authentication request signal have already been stored in the storage area 15B, the current service request is a second or subsequent request and the communication terminal 10 performs steps S13 through S21 in the second processing mode. That is, in step S13 the communication terminal 10 sends a signal $Kb[R(i-1)_1]$ read out from the storage area 15B, as a service request signal SRi (where $i \geq 2$), to the communication processing unit 20 and in step S14 the terminal 10 deciphers, under the temporary authentication key Kc, the signal $R(i-1)_1$ from the signal $Kc[R(i-1)_1]$ read out of the storage area 15B and updates the temporary authentication key Kc to $R(i-1)_1$. In step S14 the communication terminal 10 waits for an authentication request from the communication processing unit 20, and upon receiving the enciphered signals $Kc[Ri_1]$ and $Kb[Ri_1]$ and the random number $Ri_2$ as the authentication request signal in step S15, the communication terminal 10 stores these enciphered signals $Kc[Ri_1]$ and $Kb[Ri_1]$ in the storage area 15B in step S16 and, at the same time, it obtains a signal $Kc[Ri_2]$ by enciphering the random number $Ri_2$ with the temporary authentication key Kc. Next, in step S17 the communication terminal 10 sends the enciphered signal $Kc[Ri_2]$ as an authentication response signal to the communication processing unit 20 and then enters a service response waiting state in step S18. The communication terminal 10 goes into a service receiving state when it receives, in step S19, from the communication processing unit 20 a service response signal indicating that the validity of the authentication response signal has been verified. When receiving an authentication error signal indicating the invalidity of the authentication response signal from the communication processing unit 20 in step S20, the communication terminal 10 erases the signals Kc[Ri$_1$] and Kb[Ri$_1$] in the storage area 15B in step S21, thereafter returning to step S1. Consequently, steps S3 through S12 in the first processing mode will be executed next.

Figure 12:
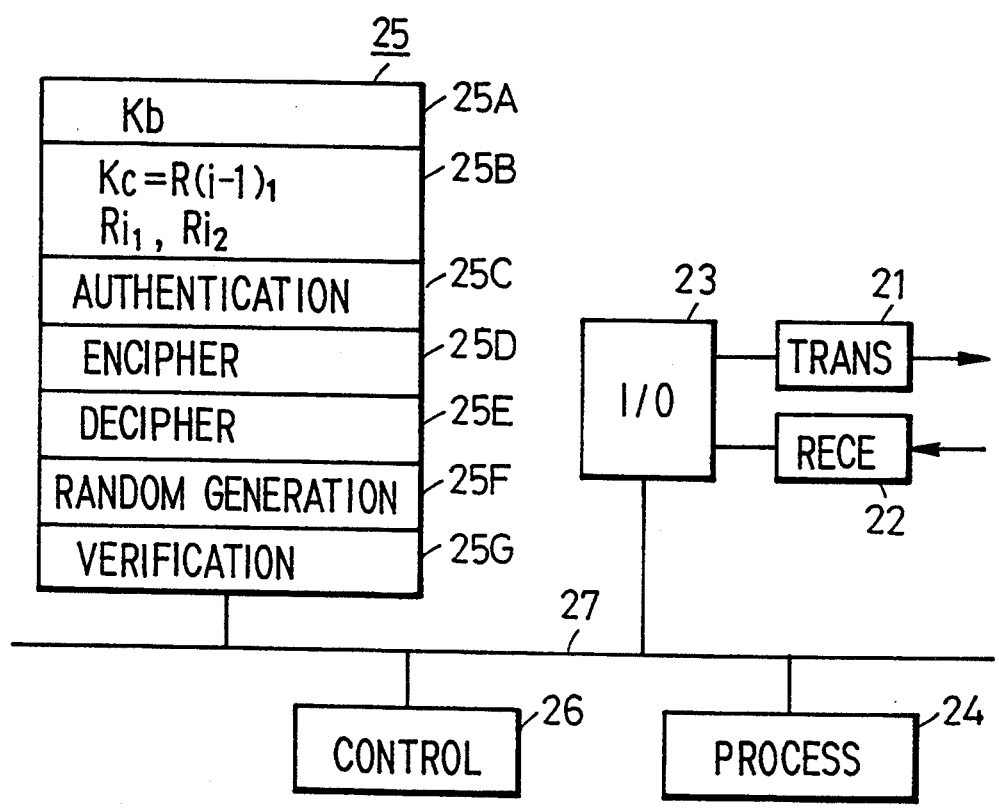
FIG. 12 is a block diagram illustrating an example of the construction of a communication processing unit depicted in FIG. 9.

FIG. 12 illustrates, in block form, the construction of the communication processing unit 20 in the FIG. 9 embodiment. This construction is basically identical with that of the communication processing unit 20 shown in FIG. 6. In the area 25C of the storage 25 are stored the signal Kb[R(i−1)$_1$] received as a service request in the second processing mode, the updated temporary authentication key Kc to R(i−1)$_1$ and the new pair of random numbers Ri$_1$ and Ri$_2$. In the storage area 25B there is stored a program of the authentication procedure that the communication processing unit 20 in FIG. 9 executes. In the storage area 25F there is stored a program for generating the pair of random numbers Ri$_1$ and Ri$_2$. The programs of various procedures loaded in the other storage areas 25D, 25E and 25G are identical in contents with the programs stored in the corresponding storage areas in FIG. 6 except parameters used.

Figure 13:
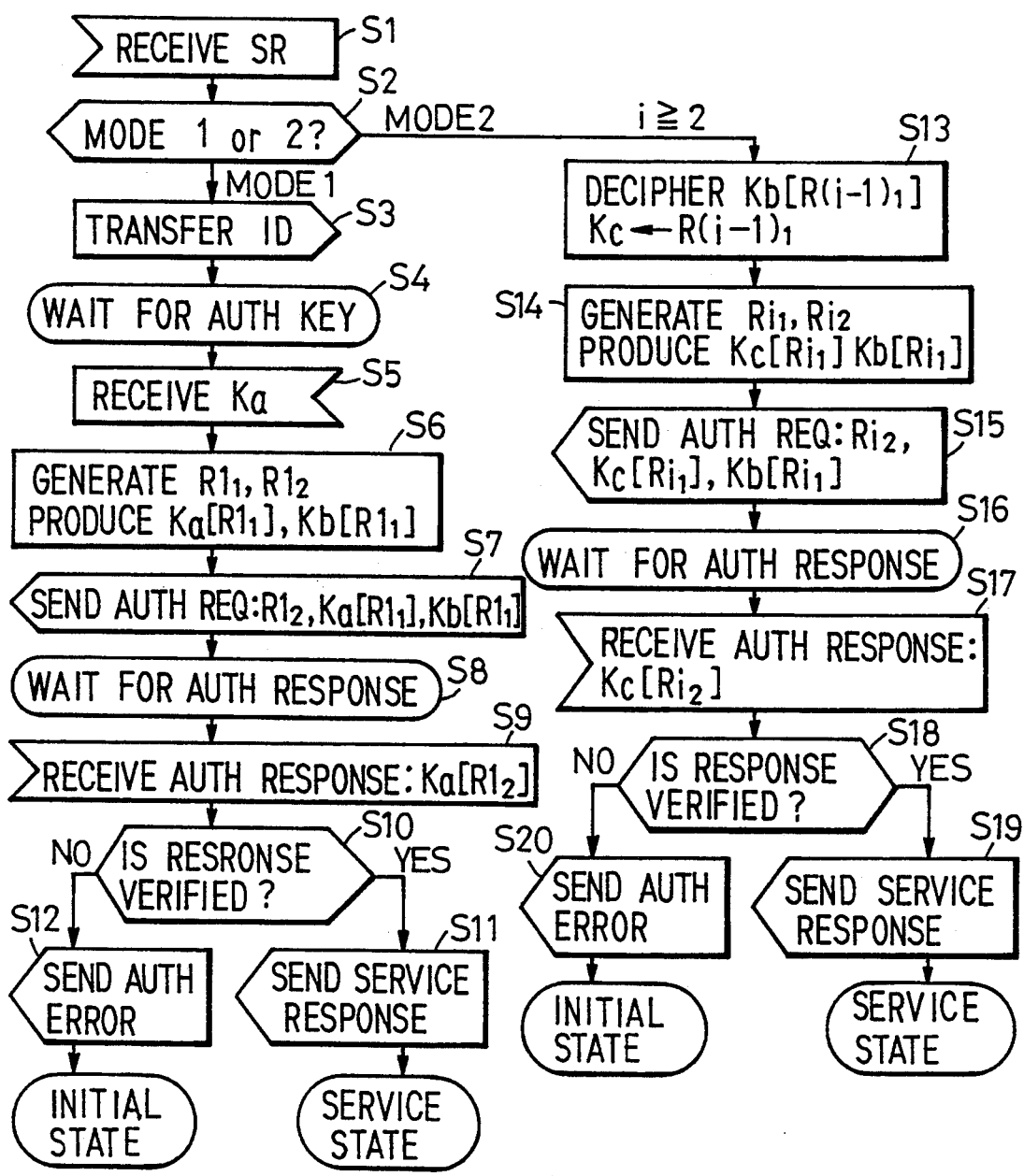
FIG. 13 is a flowchart showing the authentication procedure of the communication processing unit depicted in FIG. 9.

FIG. 13 illustrates the authentication procedure of the communication processing unit 20 stored in the storage area 25C shown in FIG. 12. As will be seen from FIG. 13, the basic constitution of this authentication procedure is the same as that shown in FIG. 7 except the parameters used. For instance, in steps S3 through S12 of the first processing mode, the pair of random numbers Ri$_1$ and Ri$_2$ are generated and further their enciphered versions Ka[Ri$_1$] and Kb[Ri$_1$] are created (step S6), and then these enciphered signals and the random number R1$_2$ are transmitted as an authentication request signal to the communication terminal 10 (step S7). An authentication response signal Ka[R1$_2$] is received from the communication terminal 10 (step S9) and the validity of the authentication response signal is verified (step S10). In step S13 through S20 of the second processing mode, a signal R(i−1)$_1$ deciphered from the enciphered signal Kb[R(i−1)$_1$] received as a service request signal is defined as the temporary authentication key Kc (step S13), and a new pair of random numbers Ri$_1$ and Ri$_2$ are generated and a signal is created by enciphering the random number Ri$_1$ under the authentication key Kc (step S14), after which the enciphered signals Kc[Ri$_1$] and Kb[Ri$_1$] and the random number Ri$_2$ are sent as an authentication request signal to the communication terminal 10 (step S15). The authentication response signal Kb[R1$_2$] is received from the communication terminal 10 (step S17) and its validity is verified (step S18).

FIG. 14 shows an authentication procedure which is used in the case of the FIG. 9 embodiment being applied to a handover (i.e. channel switching during communication or hand off during conversation) in mobile telecommunication. At first, the mobile station 10 transmits a call originating signal. This corresponds to the service request signal SR1 from the communication terminal 10 in FIG. 9. Thereafter, the authentication of the mobile station 10 is made using the same procedure as in the first processing mode in FIG. 9 and then communication is started. When the mobile station 10 moves out of the current radio zone and into a new one afterward, the handover takes place so as to continue the communication. In this case, when the terminal 10 detects a zone change and performs the handover, it first transmits to a new base station 20b a handover request signal containing the signal Kb[(Ri−1)$_1$] (where i≧2) stored in the storage area 15B. The new base station 20b deciphers the received signal into the random number R(i−1)$_1$, which is used as a new temporary authentication key Kc. Furthermore, the new base station 20b generates a new pair of random numbers Ri$_1$ and Ri$_2$ and then transmits to the terminal 10 an authentication request signal that is composed of a signal Kc[Ri$_1$] obtained by enciphering the random number Ri$_1$ under the temporary authentication key Kc, a signal Kb[Ri$_1$] obtained by enciphering the random number Ri$_1$ under the authentication key Kb, and the random number Ri$_2$. The terminal 10 stores the received signals Kc[Ri$_1$] and Kb[Ri$_1$] and, at the same time, generates an enversion Kc[Ri$_2$] of the random number Ri$_2$ by using the random number R(i−1)$_1$ as the temporary authentication key Kc, the enciphered signal Kc[Ri$_2$] being sent as an authentication response signal to the new base station 20b. Upon completion of the authentication, the new base station 20b sends a handover acceptance signal to the terminal 10, which recognizes therefrom the completion of the authentication.

The embodiment of FIG. 9 has been described in connection with the authentication method in the case of generating the pair of random numbers Ri$_1$ and Ri$_2$ for each service request, but it is also possible to employ a method according to which one of the random numbers is omitted and the communication terminal 10 sends back, as the authentication response signal, a signal Kc[Kb[Ri]] produced by enciphering the one enciphered random number Kb[Ri] received as the authentication request signal, using the key Kc (where Kc=Ka when i=1). The authentication procedures of the first and second processing modes are shown in FIG. 15 in correspondence with FIG. 9 and only principal processing different from that in the FIG. 9 embodiment will be described below.

As shown in FIG. 15, in the first processing mode, the communication processing unit 20 generates one random number R1 and creates enciphered signals Ka[R1] and Kb[R1] in step S4, then transmits these enciphered signals as an authentication request signal to the communication terminal 10 in step S5. The communication terminal 10 stores these enciphered signals Ka[R1] and Kb[R1] and enciphers the signal Kb[R1] using the authentication key Ka (step S9) and returns the enciphered signal Ka[Kb[R1]] as an authentication response signal to the communication processing unit 20 (step S7). Since the communication processing unit 20 has the key Kb preassigned thereto and the key Ka obtained as the result of the service request to the storage 30, it is capable of obtaining a signal R1 by deciphering the received authentication response signal Kc[Kb[R1]] and matching it with the random number R1 generated in step S4. Alternatively, a signal Kc[Kb[R1]], which is produced by enciphering the random number R1 generated in step S4, using the keys Kb and Ka, may be matched with the received authentication response signal Kc[Kb[R1]].

Similarly, each time a service request is made in the second processing mode (i≧2), the communication processing unit 20 generates one random number Ri and creates enciphered signals Kc[Ri] and Kb[Ri] in step S14. These enciphered signals are sent as an authentication request signal to the communication terminal 10. The communication terminal 10 stores the received enciphered signals Kc[Ri] and Kb[Ri] and enciphers the signal Kb[Ri] by the temporary authentication key Kc (step S16), then sends the enciphered signal Kc[Kb[Ri]] as an authentication response signal back to the communication processing unit 20. As in the case of the first processing mode, the communication processing unit 20 is capable of verifying the validity of the authentication response signal Kc[Kb[Ri]] by use of the keys Kb and Kc. As will be seen from the above, in this embodiment, the communication terminal 10 regards, as a random number, the enciphered random number Kb[Ri] received as part of the authentication request signal, as is the case with the one random number $Ri_2$ of the random number pair in the FIG. 9 embodiment, and this enciphered random number is further enciphered and sent as an authentication response signal back to the communication processing unit 20. Also in the embodiment of FIG. 15, the temporary authentication key Kc is updated by R(i−1) for each service request in step S12 as in the case of the FIG. 9 embodiment—this provides increased security for the communication between the terminal 10 and the communication processing unit 20. Moreover, the updating of the temporary authentication key Kc in the communication terminal 10 may also be made at the end of the authentication processing for each service request as in steps S9 and S19 indicated by the broken lines in FIG. 15.

The constructions of the communication terminal 10 and the communication processing unit 20 are basically identical with the constructions shown in FIGS. 10 and 12, respectively, and hence they are not shown. Further, the authentication procedures that the terminal 10 and processing unit 20 execute are the same as the procedures shown in FIGS. 11 and 13, respectively, except the points described above with reference to FIG. 15; hence such authentication procedures are not shown. Besides, it is evident that the FIG. 15 is applicable to the handover processing in mobile telecommunication as is the case with the FIG. 9 embodiment, and the authentication procedure therefor is shown in FIG. 16, but no description will be given thereof since its contents can easily be understood by referring to FIG. 14.

In the above embodiments the mode specifying information M for distinguishing between the first and second processing modes may be inserted in the signal that are sent from the communication terminal 10 to the communication unit 20, or the presence or absence of the information Kb[Ri] may also be used to distinguish between the two modes.

FIG. 17 illustrates the procedure following the basic principles of the authentication method according to the present invention applied to the three embodiments of FIGS. 3, 9 and 15. As described previously, the communication processing unit 20 responds to an i-th (i=1) communication request to perform the authentication processing in the first processing mode. That is, in steps S2 and S3 the authentication key Ka corresponding to the communication terminal 10 is read out from the storage 30, and in step S4 enciphered authentication information-Xbi for the communication processing unit 20, enciphered authentication information Xai for the communication terminal 10 and random information Yi are generated. The pieces of enciphered information Xbi and Xai are related to the authentication keys Kb and Ka and correspond to the pieces of enciphered information Kb[Ka], Ka[Ri], Kb[Ri], etc. in the embodiments described previously. The random information Yi corresponds to the afore-mentioned random numbers Ri, $Ri_2$ and Kb[Ri]. The communication terminal 10 receives the pieces of enciphered authentication information Xbi and Xai and the random information Yi as an authentication request signal and, in step S6, stores the pieces of enciphered authentication information Xbi and Xai as information for generating the authentication key that is to be used in the next second processing mode. On the other hand, the random information Yi is enciphered using the authentication key Ka and returned as an authentication response signal Ka[Yi] to the communication processing unit 20, which in turn verifies the response signal Ka[Yi] using the authentication key Ka and the random information Yi (step S8).

For a second or subsequent communication request (i≧2), the authentication processing is executed in the second processing mode. That is, enciphered authentication information Xb(i−1) received in the previous processing is sent as the communication request signal SRi from the communication terminal 10 to the communication processing unit 20 (step S11). At the same time, the communication terminal 10 deciphers the enciphered authentication information Xa(i−1) to obtain an authentication key Kci that is to be used (step S12). The communication processing unit 20 deciphers, in step S13, the previous enciphered authentication information Xb(i−1) currently received as the communication request signal SRi and uses the deciphered signal as the authentication key Kci in the current authentication process. Moreover, the communication processing unit 20 generates new pieces of enciphered authentication information Xbi and Xai and random information Yi and transmits them as an authentication request signal to the communication terminal 10. The terminal 10 enciphers the random information Yi using the authentication key Kci generated in step S12 (step S16) and sends it the enciphered random information as an authentication response signal Kc[Yi] back to the communication unit 20 (step S16). The communication processing unit 20 verifies the validity of the response signal in step S17.

According to the authentication procedure of FIG. 17, in the case of the FIG. 3 embodiment, the enciphered authentication information Xai for the communication terminal 10 is omitted and information Kb[Ka], produced by enciphering the authentication key Ka of the communication terminal 10 using the authentication key Kb of the communication processing unit 20, is used as the enciphered authentication information Xbi for the communication processing unit 20. In the second processing mode, the communication terminal 10 always uses the same information Kb[Ka] as the communication request signal and the signal Ka as the authentication key (Kci=Ka). Hence, the process of step S12 is omitted. On the other hand, the communication processing unit 20 does not produce enciphered authentication information in step S13 but instead generates the random number Ri as the random information Yi and transmits it as an authentication request signal to the communication terminal 10 in step S14. Thus, the FIG. 3 embodiment is simplified in the procedure in the second processing mode, but there is the possibility of communication being wiretapped, because the same information Kb[Ka] is always used as the communication request signal in step S11, as referred to previously.

The embodiment of FIG. 9 is a faithful materialization of the basic authentication procedure shown in FIG. 17. The one random number $Ri_1$ of the pair of random numbers $Ri_1$ and $Ri_2$ as enciphered authentication information for the communication processing unit 20 and the communication terminal 10 is enciphered by the authentication keys Kb and Kci to obtain pieces of information $Kb[Ri_1]$ and $Kci[Ri_1]$, and the other random number $Ri_2$ as the random information Yi. According to the FIG. 9 embodiment, the information $Kb[Ri_1]$ used as a communication request signal changes for each communication request, providing increased security against wiretapping. In the FIG. 15 embodiment, the one random number $Ri_2$ of the pair of random numbers $Ri_1$ and $Ri_2$ is replaced with the signal $Kb[Ri_1]$ in FIG. 9. To this end, the random number Ri is generated and pieces of information Kb[Ri] and Kci[Ri] are produced as the enciphered authentication information Xbi and Xai; in this case, the information Kb[Ri] serves also as the random information Yi.

As described above, according to the present invention, since the communication processing unit 20 needs not to receive the authentication key Kc of the communication terminal 10 from the storage 30, the authentication processing time can be reduced accordingly—this leads to reduction of the communication processing time and alleviation of a connection delay.

It will be apparent that many modifications and variations may be effected without departing from the scope of the novel concepts of the present invention.

What is claimed is:

1. In a communication system which includes a communication processing unit having a first authentication key Kb and performing communication processing, a communication terminal having a second authentication key Ka unique thereto and connected via a communication channel to said communication processing unit, and a storage storing said second authentication key Ka for authenticating said communication terminal and responsive to a request from said communication processing unit to provide thereto said second authentication key Ka, an authentication method whereby said communication processing unit verifies the validity of said communication terminal when receiving therefrom a communication request;

said authentication method including a step wherein said communication processing unit responds to a communication request signal from said communication terminal to determine if said communication request signal is a first one and if so, a first processing mode is executed and if not, a second processing mode is executed;

A. said first processing mode comprising the steps: wherein said communication processing unit:
(a) responds to said communication request from said communication terminal to acquire said second authentication key Ka of said communication terminal from said storage; and
(b) generates authentication information Xbi enciphered by said first authentication key Kb and random information Yi and transmits an authentication request signal containing said pieces of information, to said communication terminal;
wherein said communication terminal:
(c) transmits information Ka[Yi] as an authentication response signal to said communication processing unit, said information Ka[Yi] being obtained by enciphering said random information Yi with said second authentication key Ka; and
(d) stores said enciphered authentication information Xbi; and
wherein said communication processing unit:
(e) verifies said authentication response signal using said second authentication key Ka; and B. said second processing mode comprising the steps: wherein said communication terminal:
(f) transmits to said communication processing unit a communication request signal containing said enciphered authentication information Xbi obtained by authentication processing executed in response to the previous communication request;
wherein said communication processing unit:
(g) deciphers said enciphered authentication information Xbi into a deciphered authentication key Kci;
(h) generates new random information Yi; and
(i) transmits an authentication request signal containing said random information Yi to said communication terminal;
wherein said communication terminal:
(j) enciphers said received random information Yi by said authentication key Kci and sends said enciphered random information as an authentication response signal to said communication processing unit; and
wherein said communication processing unit:
(k) verifies said received authentication response signal using said deciphered authentication key Kci.

2. The method of claim 1 wherein said step (b) is a step wherein information Kb[Ka] produced by enciphering said second authentication key Ka by said first authentication key Kb is generated as said enciphered authentication information Xbi and wherein said communication terminal uses said second authentication key Ka as said authentication key Kci in said step (j) of said second processing mode.

3. The method of claim 1 wherein:

said step (b) comprises a step of generating first and second random numbers $Ri_1$ and $Ri_2$ and a step of enciphering said first random number $Ri_1$ by said first and second authentication keys Kb and Ka to obtain first and second enciphered random numbers $Kb[Ri_1]$ and $Ka[Ri_1]$, said first enciphered random number $Kb[Ri_1]$ being used as first authentication information for said communication processing unit, said second enciphered random number $Ka[Ri_1]$ being as second enciphered authentication information for said communication terminal and said authentication request signal which is sent to said communication terminal containing said second random number $Ri_2$ as said random information Yi and said first and second enciphered authentication information $Kb[Ri_1]$ and $Ka[Ri_1]$, said i being 1 representing first authentication processing;

said step (d) is a step of storing said second enciphered authentication information $Ka[Ri_1]$ together with said first enciphered authentication information;

said second processing mode includes a step wherein a first random number $R(i-1)_1$ obtained by deciphering previous second enciphered authentication information $Kc[R(i-1)_1]$ stored in said communication terminal is updated as said authentication key Kci that said communication terminal is to use in authentication processing for the current communication request;

said enciphered authentication information Xbi in said step (f) is first enciphered random number $Kb[R(i-1)_1]$ obtained in authentication processing for the previous communication request, i being an integer equal to or greater than 2;

said step (g) is a step wherein a first random number $R(i-1)_1$ obtained by deciphering said first enciphered authentication information $Kb[R(i-1)_1]$ is obtained as said deciphered authentication key Kci;

said step (h) comprises a step of generating new first and second random number $Ri_1$ and $Ri_2$, said second random number $Ri_2$ being obtained as a new version of said random information Yi and a step of enciphering said first random number $Ri_1$ by said first authentication key Kb and said deciphered authentication key Kci to generate first and second pieces of enciphered authentication information $Kb[Ri_1]$ and $Kci[Ri_1]$;

said step (i) is a step wherein said second random number $Ri_2$ and said first and second pieces of enciphered authentication information $Kb[Ri_1]$ and $Kci[Ri_1]$ as said random information Yi are sent, as information contained in said authentication request signal, to said communication terminal; and said step (j) includes a step of storing said first and second pieces of enciphered authentication information $Kb[Ri_1]$ and $Kci[Ri_1]$ received from said communication processing unit.

4. The method of claim 1 wherein:

said step (b) comprises a step of generating first and second random numbers $Ri_1$ and $Ri_2$ and a step of enciphering said first random number $Ri_1$ by said first and second authentication keys Kb and Ka to obtain first and second enciphered random numbers $Kb[Ri_1]$ and $Ka[Ri_1]$, said first enciphered random number $Kb[Ri_1]$ being used as said first enciphered authentication information for said communication processing unit, said second enciphered random number $Ka[Ri_1]$ being used as second enciphered authentication information for said communication terminal, said authentication request signal which is sent to said communication terminal containing said second random number $Ri_2$ as said random information Yi and said first and second pieces of enciphered authentication information $Kb[Ri_1]$ and $Ka[Ri_1]$, said i being 1 representing first authentication processing;

said step (d) is a step of storing said second enciphered authentication information $Ka[Ri_1]$ together with said first enciphered authentication information;

said enciphered authentication information Xbi in said step (f) is a first enciphered random number $Kb[R(i-1)_1]$ obtained in authentication processing for the previous communication request, said i being an integer equal to or greater than 2;

said step (g) is a step of obtaining, as said deciphered authentication key Kci, a first random number $R(i-1)_1$ obtained by deciphering said first enciphered authentication information $Kb[R(i-1)_1]$;

said step (h) comprises a step of generating new first and second random numbers $Ri_1$ and $Ri_2$, said second random number $Ri_2$ being obtained as a new version of said random information Yi, and a step of enciphering said first random number $Ri_1$ by said first authentication key Kb and said deciphered authentication key Kci to generate first and second pieces of enciphered authentication information $Kb[Ri_1]$ and $Kci[Ri_1]$;

said step (i) is a step wherein said second random number $Ri_2$ as said random information Yi and said first and second pieces of enciphered authentication information $Kb[Ri_1]$ and $Kci[Ri_1]$ are sent, as information contained in said authentication request signal, to said communication terminal;

said step (j) includes a step of storing said first and second pieces of authentication information $Kb[Ri_1]$ and $Kci[Ri_1]$ received from said communication processing unit; and said second processing mode includes a step wherein a first random number $Ri_1$ obtained by deciphering said first enciphered random number $Kci[Ri_1]$ received by said communication terminal in authentication processing for the current communication request is updated, in said communication terminal, as a deciphered authentication key Kci that said communication terminal is to use in authentication processing for the next communication request.

5. The method of claim 1 wherein:

said step (b) comprises a step of generating a random number Ri and a step of enciphering said random number Ri by said first and second authentication keys Kb and Ka to obtain first and second enciphered random numbers $Kb[Ri]$ and $Ka[Ri]$, said first enciphered random number $Kb[Ri]$ being used as said first enciphered authentication information for said communication processing unit, said second enciphered random number $Ka[Ri]$ being used as said second enciphered authentication information for said communication terminal and said first enciphered random number $Kb[Ri]$ being used also as said random information Yi, said i being 1 representing first authentication processing;

said second processing mode includes a step wherein a random number $R(i-1)$ obtained by deciphering previous enciphered authentication information $Kci[R(i-1)]$ stored in said communication terminal is updated as a deciphered authentication key Kci that said communication terminal is to use in authentication processing for the current communication request;

said first enciphered authentication information Xbi contained in said communication request signal in said step (f) is said first enciphered authentication information $Kb[R(i-1)]$ obtained in authentication processing for the previous communication request;

said step (g) is a step of deciphering said first enciphered authentication information $Kb[R(i-1)]$ to obtain a random number $R(i-1)$ as said deciphered authentication key Kci;

said step (h) is a step of generating a random number Ri, enciphering said random number Ri by said first authentication key Kb and said deciphered authentication key Kci to obtain first and second enciphered random numbers $Kb[Ri]$ and $Kci[Ri]$ as new versions of said first and second pieces of enciphered authentication information, and obtaining said first enciphered authentication information $Kb[Ri]$ as a new version of said random information Yi, said i being an integer equal to or greater than 2;

said step (i) is a step of sending said authentication request signal containing said first enciphered authentication information to said communication terminal; and said step (j) is a step wherein information Kci[Kb[Ri]] obtained by enciphering said first enciphered random number Kb[Ri] using said deciphered authentication key Kci is sent back to said communication processing unit together with said authentication signal.

6. The method of claim 1 wherein:

said step (b) comprises a step of generating a random number Ri and a step of enciphering said random number Ri by said first and second authentication keys Kb and Ka to obtain first and second enciphered random numbers Kb[Ri] and Ka[Ri], said first enciphered random number Kb[Ri] being used as said first enciphered authentication information for said communication unit, said second enciphered random number Ka[Ri] being used as second enciphered authentication information for said communication terminal and said first enciphered random number Kb[Ri] being used also as said random information Yi, said i being 1 representing first authentication processing;

said first enciphered authentication information Xbi contained in said communication request signal in said step (f) is said first enciphered authentication information Kb[R(i−1)] obtained in authentication processing for the previous communication request;

said step (g) is a step of deciphering said enciphered authentication information Kb[R(i−1)] to obtain a random number as said deciphered authentication key Kci;

said step (h) is a step of generating a random number Ri, enciphering said random number ri by said first authentication key Kb and said deciphered authentication key Kci to obtain first and second enciphered random numbers Kb[Ri] and Kci[Ri] as new versions of said first and second pieces of enciphered authentication information, and obtaining said first enciphered authentication information Kb[Ri] as a new version of said random information Yi, said i being an integer equal to or greater than 2;

said step (i) is a step of sending said authentication request signal containing said first enciphered authentication information Kb[Ri] to said communication terminal;

said step (j) is a step wherein information Kci[Kb[Ri]] obtained by enciphering said first enciphered random number Kb[Ri] using said deciphered authentication key Kci is sent back to said communication processing unit together with said authentication response signal; and said second processing mode includes a step wherein a random number Ri obtained by deciphering said second enciphered random number Kci received by said communication terminal in authentication processing for the current communication request is updated as a deciphered authentication key Kci that said communication terminal is to use in authentication processing for the next communication request.

7. The method of claim 1 wherein said step (e) of said first processing mode is a step of verifying that information obtained by deciphering said authentication response signal received from said communication terminal, using said second authentication key Ka, matches said random information Yi transmitted as said authentication request signal to said communication terminal match each other.

8. The method of claim 1 wherein said step (k) of said second processing mode is a step of verifying that information obtained by deciphering said authentication response signal received from said communication terminal, through use of said deciphered authentication key Kci, matches said random information Yi transmitted as said authentication request signal to said communication terminal.

9. The method of claim 1 wherein said step (e) of said first processing mode is a step of verifying that information obtained by enciphering said random information Yi sent as said authentication request signal to said communication terminal, through use of said second authentication key Ka, matches said authentication response signal.

10. The method of claim 1 wherein said step (k) of said second processing mode is a step of verifying that information obtained by enciphering said random information Yi sent as said authentication request signal to said communication terminal, through use of said deciphered authentication key Kci, matches said authentication response signal.

11. The method of claim 1 wherein said communication terminal is a portable station, said communication processing unit is a base station in a mobile telecommunication system, said communication request signal in said first processing mode is an originating call and said communication request signal in said second processing mode is a signal for requesting channel switching during communication.

12. The method of claim 1 wherein said communication terminal is an IC card in an IC card system and said communication processing unit is a card reader.

13. In a telecommunication system which comprises a communication terminal having a unique second authentication key Ka, a communication processing unit having a first authentication key Kb, connected via a communication channel to said communication terminal and responsive to a communication request signal from said communication terminal to verify the validity of said communication terminal, and a storage storing said second authentication key Ka for the authentication of said communication terminal and responsive to a request from said communication processing unit to provide thereto said second authentication key Ka, said communication terminal comprising:

means for receiving, as an authentication request signal from said communication processing unit, random information Yi and enciphered authentication information Xbi enciphered by said first authentication key Kb;

means whereby said random information Yi contained in said authentication request signal received from said communication processing unit is enciphered with said second authentication key Ka to generate an authentication response signal to be sent back to said communication processing unit and said random information Yi contained in said authentication request signal received in response to a second or subsequent communication request is enciphered with an authentication key Kci to generate said authentication response signal;

storage means for storing said enciphered authentication information contained in said authentication request signal; and means for sending a communication request signal containing identification information, in said first communication request, and for sending, in said second or subsequent communication request, a communication request signal containing said enciphered authentication information Xbi read out from said storage means.

14. In a telecommunication system which comprises a communication terminal having a unique second authentication key Ka, a communication processing unit having a first authentication key Kb, connected via a communication channel to said communication terminal and responsive to a communication request signal from said communication terminal to verify the validity of said communication terminal, and a storage storing said second authentication key Ka for the authentication of said communication terminal and responsive to a request from said communication processing unit to provide thereto said second authentication key Ka, said communication processing unit comprising:

means for determining if said communication request signal received from said communication terminal is a first communication request signal;

means for obtaining said second authentication key Ka from said storage in the case of a first communication request;

means responsive to each communication request to generate random information Yi;

means responsive to said first communication request signal to generate enciphered authentication information Xbi enciphered by said first authentication key Kb of said communication processing unit;

means for sending said enciphered authentication information Xbi as a first authentication request signal to said communication terminal and for sending at least said random information Yi as said second or subsequent authentication request signal to said communication terminal;

means for receiving said second or subsequent communication request signal and for obtaining a deciphered authentication key Kci by deciphering said enciphered authentication information contained in said second or subsequent communication request signal and sent to said communication terminal in the previous authentication processing; and means for verifying the validity of an authentication response signal from said communication terminal through use of said deciphered authentication key Kci and said random information Yi.

15. The communication terminal of claim 13 wherein: said random information Yi contained in said authentication request signal received from said communication processing unit is a random number Ri; said enciphered authentication information Xbi contained in said first communication request signal is information Kb[Ka] obtained by enciphering said second authentication key Ka with said first authentication key Kb; said authentication response signal generating means generates, as said authentication response signal, information Ka[Ri] obtained by enciphering said received random number Ri with said second authentication key Ka; and said communication request signal generating means generates a communication request signal containing identification information ID of said communication terminal in said first communication request and generates a communication request signal containing said enciphered information Kb[Ka] read out from said storage means in said second or subsequent communication request.

16. The communication processing unit of claim 14 wherein: said enciphered authentication information generating means is means for generating, as said enciphered authentication information Xbi, information Kb[Ka] obtained by enciphering said second authentication key Ka with said first authentication key Kb; and said authentication request signal sending means is means for sending said enciphered authentication information Kb[Ka] and said random information Yi as said first authentication request signal to said communication terminal and for sending said random information Yi as said second or subsequent authentication request signal to said communication terminal.

17. The communication terminal of claim 13 wherein:
said authentication request signal received from said communication processing unit for each communication request comprises first and second enciphered random numbers $Kb[Ri_1]$ and $Kci[Ri_1]$ obtained by enciphering a first random number $Ri$ with said first authentication key Kb and a deciphered authentication key Kci, as said first enciphered authentication information Xbi and second enciphered information Xai, and a second random number $Ri_2$ as said random information Yi;

means is provided for obtaining a first random number $R(i-1)_1$ by deciphering said second enciphered random number $Kci[R(i-1)_1]$ received from said communication processing unit in authentication processing for the previous communication request, said first random number $R(i-1)_1$ being used as the current deciphering authentication key Kci, where $i \geq 2$ and in the case of $i=1$, Kci=Ka;

said storage means is means for storing said first and second pieces of enciphered information $Kb[Ri_1]$ and $Kci[Ri_1]$ contained in said authentication request signal received from said communication processing unit in response to an i-th communication request signal, where in the case of $i=1$, Kci=Ka;

said communication request signal generating means is means whereby in said second or subsequent communication request, said first enciphered authentication information $Kb[R(i-1)_1]$ stored in said storage means in the previous authentication processing is generated as said enciphered authentication information Xbi contained in said communication request signal; and said authentication response signal generating means is means whereby in an i-th communication request, information $Kci[Ri_2]$ obtained by enciphering with said deciphered authentication key Kci said second random number contained in said authentication request signal received from said communication unit is generated as said authentication response signal, where in the case of $i=1$; Kci=Ka.

18. The communication terminal of claim 13 wherein:
said communication request signal which is received from said communication processing unit for each communication request contains first and second enciphered random numbers $Kb[Ri_1]$ and $Kci[Ri_1]$ obtained by enciphering a first random number $Ri_1$ with said first authentication key Kb and a deciphered authentication key Kci, as said first enciphered authentication information Xbi and second enciphered authentication information Xai, respectively, and a second random number $Ri_2$ as said random information;

said storage means is means for storing said first and second pieces of enciphered authentication information $Kb[Ri_1]$ and $Kci[Ri_1]$ contained in an authentication request signal received from said communication processing unit in response to an i-th communication request, where in the case of $i=1$, $Kci=Ka$;

said communication request signal generating means is means whereby in said second or subsequent communication request, said first enciphered authentication information $Kb[R(i-1)_1]$ stored in said storage means in the previous authentication processing is generated as said enciphered authentication information Xbi contained in said communication request signal;

said authentication response signal generating means is means whereby in an i-th communication request, information $Kci[Ri_2]$ obtained by enciphering, with said deciphered authentication key Kci, said second random number $Ri_2$ contained in said authentication request signal received from said communication processing unit is generated as said authentication response signal, where in the case of $i=1$, $Kci=Ka$; and means is provided whereby a first random number $Ri_1$ is obtained by deciphering said second enciphered authentication information $Kci[Ri_1]$ from said communication processing unit through use of said deciphered authentication key Kci used for the generation of said authentication response signal and said first random number $Ri_1$ is updated as deciphered authentication key $Kc(i+1)$ in authentication processing for the next communication request, where in the case of $i=1$, $Kci=Ka$.

19. The communication processing unit of claim 14 wherein:

said random information generating means has means for generating a pair of first and second random numbers $Ri_1$ and $Ri_2$ in response to each reception of said communication request signal and for outputting said second random number $Ri_2$ as said random information Yi;

hen said communication request is a second or subsequent request, said communication request signal contains said first enciphered authentication information $Kb[R(i-1)_1]$ as said enciphered authentication information Xbi sent to said communication terminal, said means for generating said deciphered authentication key Kci being means for deciphering said previous first enciphered authentication information $Kb[R(i-1)_1]$ to obtain a first random number $R(i-1)_1$ as said deciphered authentication key Kci;

said enciphered authentication information generating means is means whereby, in response to an i-th communication request, first and second enciphered random numbers $Kb[Ri_1]$ and $Kci[Ri_1]$, obtained by enciphering said first random number $Ri_1$ from said random information generating means with said first authentication key Kb and said deciphered authentication key Kci, are generated as said first and second pieces of enciphered authentication information Xbi and Xai, respectively, where in the case of $i=1$, $Kci=Ka$; and said verifying means is means whereby, in said first communication request, the validity of said authentication response signal $Ka[Ri_2]$ received from said communication terminal is verified using said second authentication key Ka and said second random number $Ri_2$ and, in a second or subsequent communication request, the validity of said authentication response signal $Kci[Ri_2]$ received from said communication terminal is verified using said deciphered authentication key Kci and said second random number $Ri_2$.

20. The communication terminal of claim 13 wherein:

said authentication request signal which is received from said communication processing unit for each communication request contains, as said first enciphered authentication information Xbi and second enciphered authentication information Xai, first and second enciphered random numbers $Kb[Ri]$ and $Kci[Ri]$ obtained by enciphering a random number Ri with said first authentication key Kb and said deciphered authentication key Kci, and said first enciphered random number $Kb[Ri]$ is used also as said random information Yi;

means is provided whereby said second enciphered random number $Kci[R(i-1)]$ received from said communication processing unit in authentication processing for the previous communication request is deciphered to obtain a random number $R(i-1)$ as the current deciphered authentication key Kci, where $i \geq 2$ and in the case of $i=1$, $Kci=Ka$;

said storage means is means for storing said first and second pieces of enciphered authentication information $Kb[Ri]$ and $Kci[Ri]$ contained in an authentication request signal received from said communication processing unit in response to an i-th communication request signal, where in the case of $i=1$, $Kci=Ka$;

said communication request signal generating means is means whereby, in said second or subsequent communication request, said first enciphered authentication information $Kb[R(i-1)]$ stored in said storage means in the previous authentication processing is generated as said enciphered authentication information Xbi contained in said communication request signal; and said authentication response signal generating means is means whereby, in said i-th communication request, information $Kci[Kb[Ri]]$, obtained by enciphering, with said deciphered authentication key Kci, said first enciphered random number $Kb[Ri]$ contained in said authentication request signal received from said communication processing unit, is generated as said authentication response signal, where in the case of $i=1$, $Kci=Ka$.

21. The communication terminal of claim 13 wherein:

said authentication request signal which is received from said communication processing unit for each communication request contains, as said first enciphered authentication information Xbi and second enciphered authentication information Xai, first and second enciphered random numbers $Kb[Ri]$ and $Kci[Ri]$ obtained by enciphering a random number Ri with said first authentication key Kb and said deciphered authentication key Kci, and said first enciphered random number $Kb[Ri]$ is used also as said random information Yi;

said storage means is means for storing said first and second pieces of enciphered authentication information $Kb[Ri]$ and $Kci[Ri]$ contained in an authentication request signal received from said communication processing unit in response to an i-th communication request signal, where in the case of i=1, Kci=Ka;

said communication request signal generating means is means whereby, in said second or subsequent communication request, said first enciphered authentication information Kb[R(i−1)] stored in said storage means in the previous authentication processing is generated as said enciphered authentication information Xbi contained in said communication request signal;

said authentication response signal generating means is means whereby, in said i-th communication request, information Kci[Kb[Ri]], obtained by enciphering, with said deciphered authentication key Kci, said first enciphered random number Kb[Ri] contained in said authentication request signal received from said communication processing unit, is generated as said authentication response signal, where in the case of i=1, Kci=Ka; and means is provided whereby a random number Ri is obtained by deciphering said second enciphered authentication information Kci[Ri] from said communication processing unit through use of said deciphered authentication key Kci used for the generation of said authentication response signal and said random number Ri is updated as deciphered authentication key Kc(i+1) in authentication processing for the next communication request, where in the case of i=1, Kci=Ka.

22. The communication processing unit of claim 14 wherein:

said random information generating means has means for generating a random number Ri in response to each reception of said communication request signal;

when said communication request is a second or subsequent request, said communication request signal contains said first enciphered authentication information Kb[R(i−1)] as said enciphered authentication information Xbi sent to said communication terminal, said means for generating said deciphered authentication key Kci being means for deciphering said previous first enciphered authentication information Kb[R(i−1)] to obtain a random number R(i−1) as said deciphered authentication key Kci;

said enciphered authentication information generating means is means whereby, in response to an i-th communication request, first and second enciphered random numbers Kb[Ri] and Kci[Ri], obtained by enciphering said random number Ri from said random information generating means with said first authentication key Kb and said deciphered authentication key Kci, are generated as said first and second pieces of enciphered authentication information Xbi and Xai, respectively, said first enciphered random number Kb[Ri] being used also as said random information Yi which said random information generating means outputs, where in the case of i=1, Kci=Ka; and said verifying means is means whereby, in said first communication request, the validity of said authentication response signal Ka[Ri] received from said communication terminal is verified using said second authentication key Ka and said random number Ri and, in a second or subsequent communication request, the validity of said authentication response signal Kci[Ri] received from said communication terminal is verified using said deciphered authentication key Kci and said random number Ri.

* * * * *